Oct. 6, 1970  L. W. RICKETTS, JR., ET AL  3,532,867
DELAY CORRELATOR

Filed April 4, 1966  9 Sheets-Sheet 1

INVENTOR.
LUTHER W. RICKETTS, JR.,
ROBERT E. STALCUP,
ROBERT J. ERICKSON and
BY   GEORGE L. BUENGER
Woodard, Weikart, Emhardt & Naughton
Attorneys Oct. 6, 1970     L. W. RICKETTS, JR., ET AL     3,532,867
DELAY CORRELATOR
Filed April 4, 1966                              9 Sheets-Sheet 3
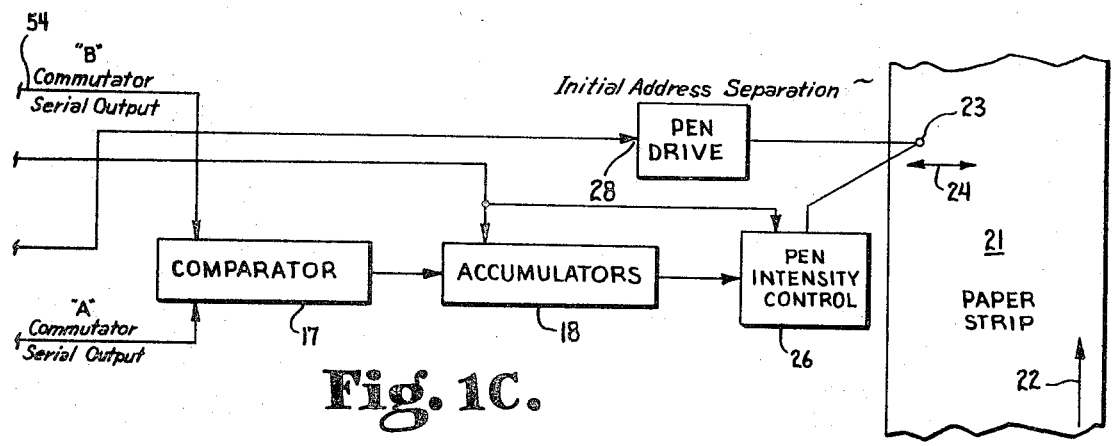
Fig. 1C.
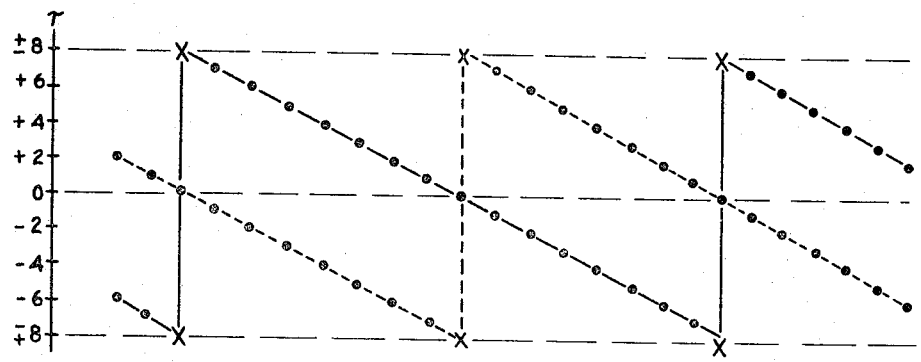
Fig. 3.      TWO-ACCUMULATOR METHOD
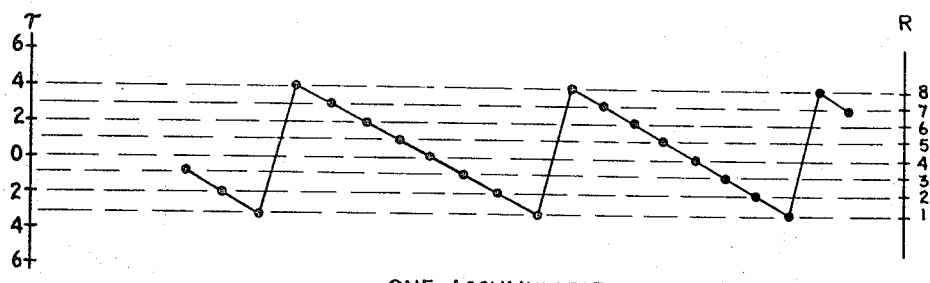
Fig. 4.      ONE-ACCUMULATOR METHOD
INVENTORS
LUTHER W. RICKETTS, JR.,
ROBERT E. STALCUP,
ROBERT J. ERICKSON and
GEORGE L. BUENGER
BY
Attorneys

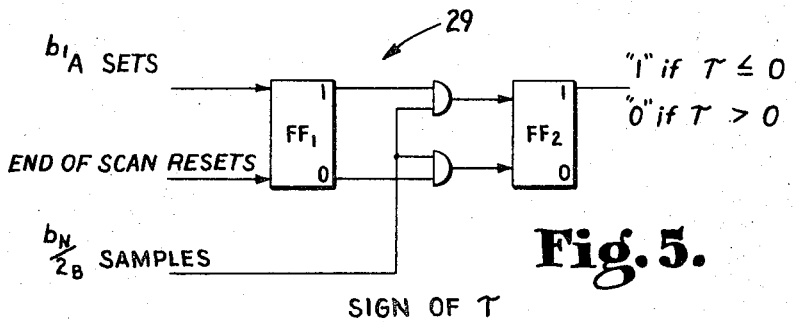
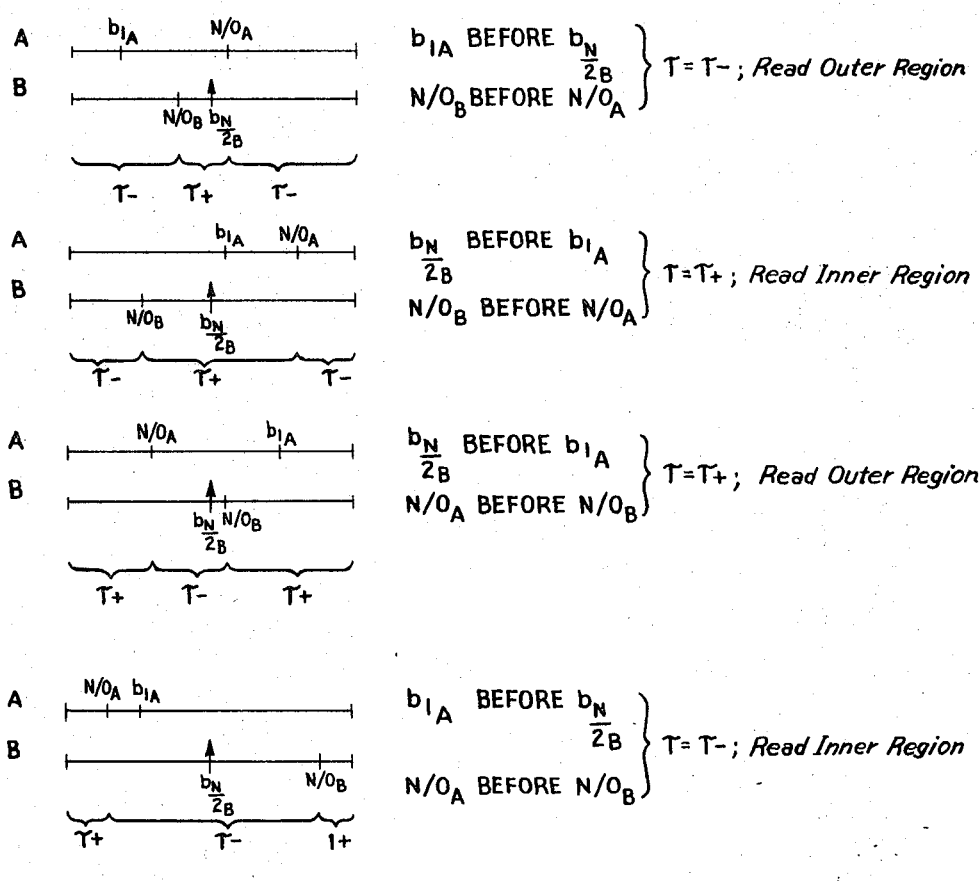
Fig. 6.

Oct. 6, 1970    L. W. RICKETTS, JR., ET AL    3,532,867
DELAY CORRELATOR
Filed April 4, 1966    9 Sheets-Sheet 6
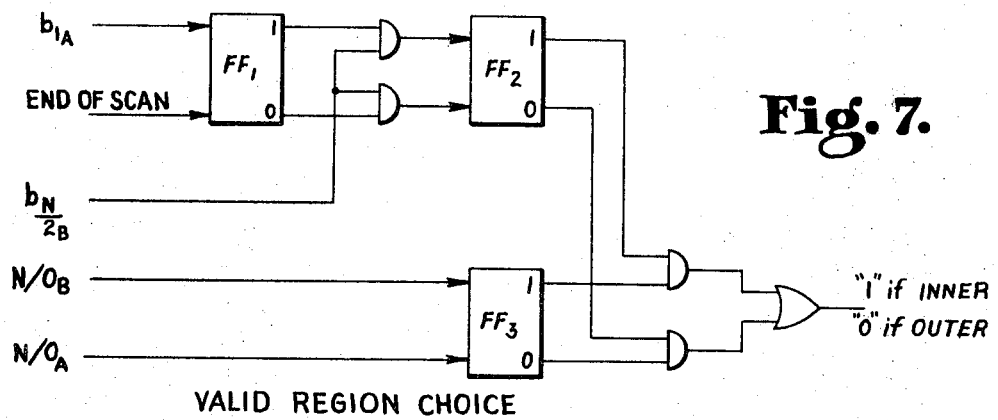
Fig. 7.
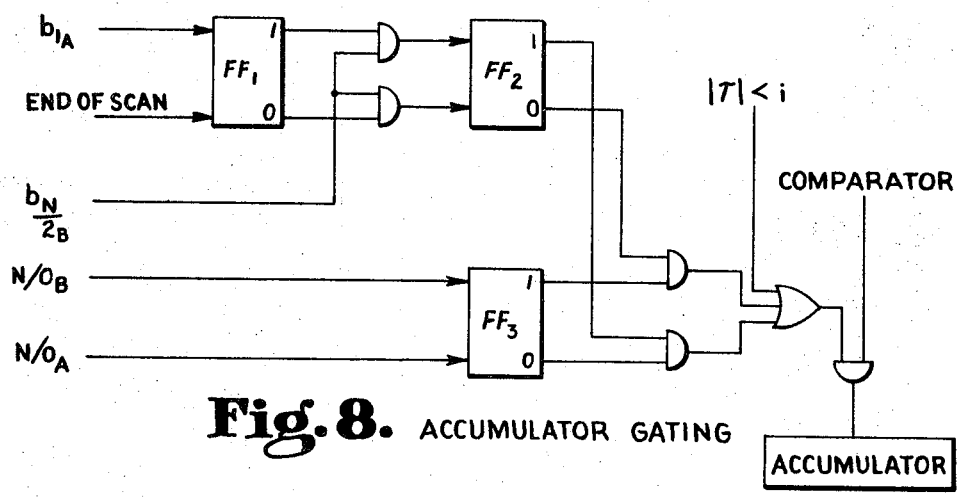
Fig. 8. ACCUMULATOR GATING
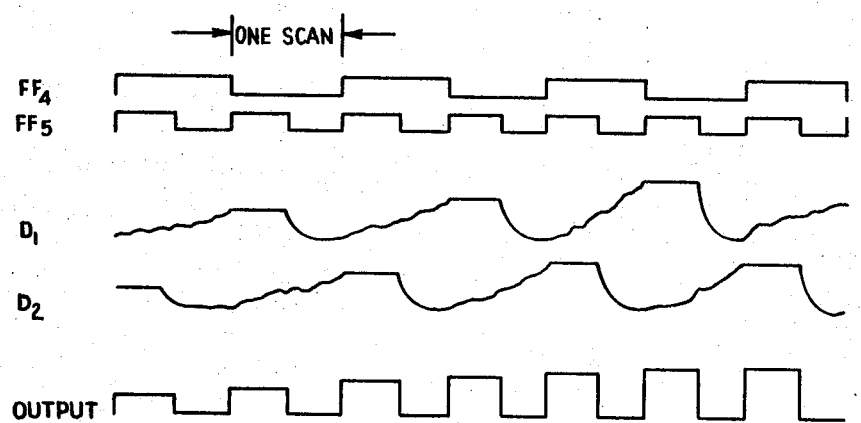
WAVEFORMS FOR FIG. 9
Fig. 10.
INVENTORS.
LUTHER W. RICKETTS, JR.,
ROBERT E. STALCUP,
ROBERT J. ERICKSON and
GEORGE L. BUENGER
BY Woodard, Weikart, Emhardt & Naughton
Attorneys

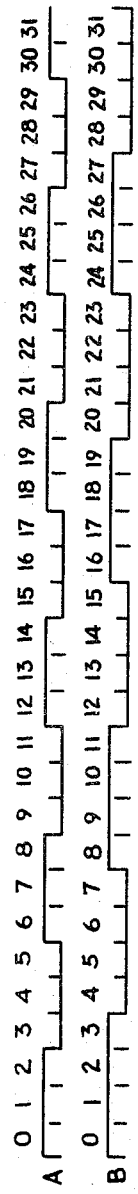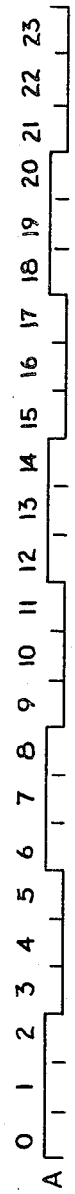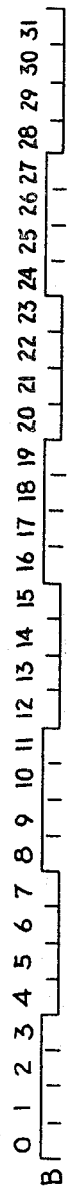

Oct. 6, 1970 L. W. RICKETTS, JR., ET AL 3,532,867
DELAY CORRELATOR
Filed April 4, 1966 9 Sheets-Sheet 9
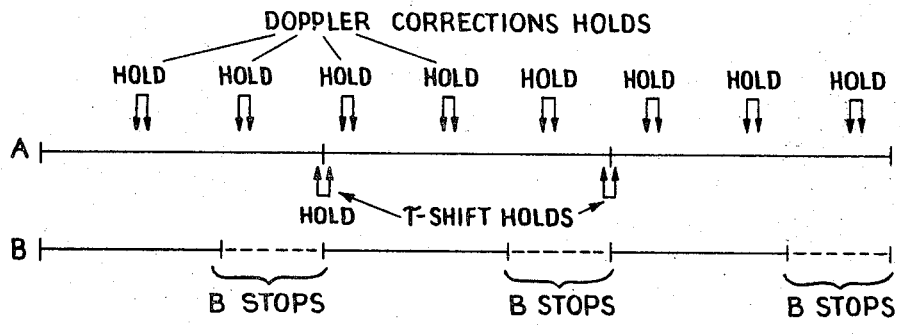
Fig. 15. A DELAYED
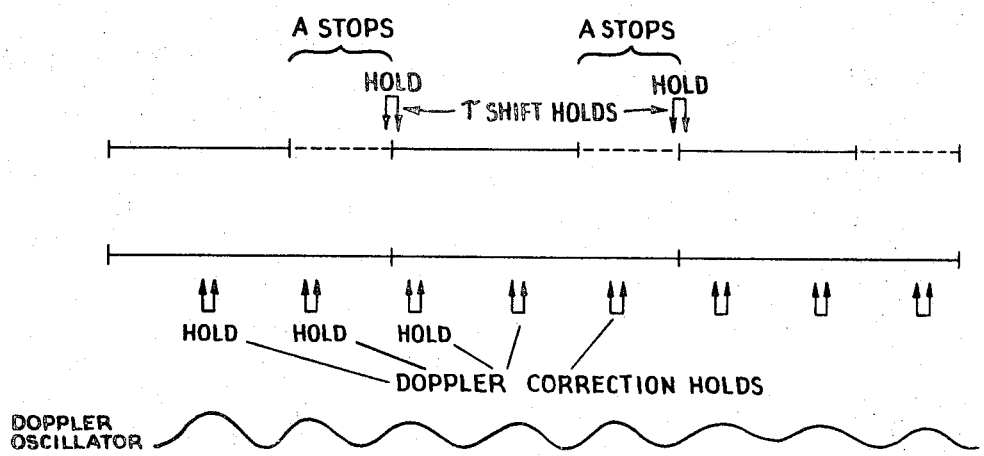
Fig. 14. B DELAYED
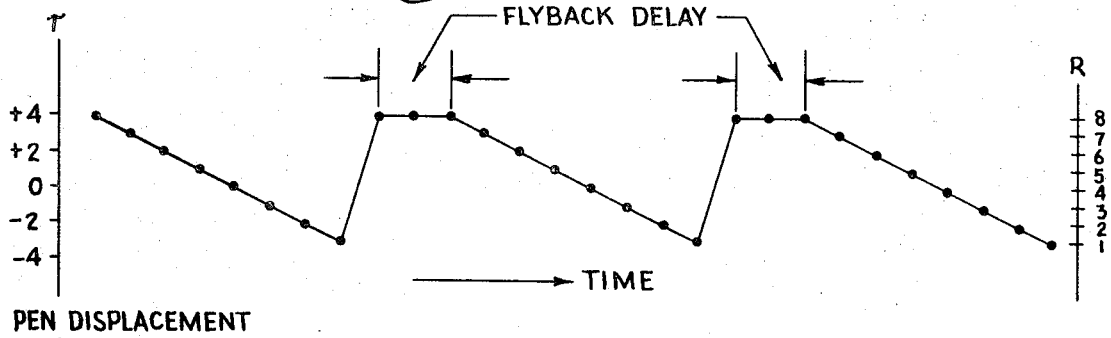
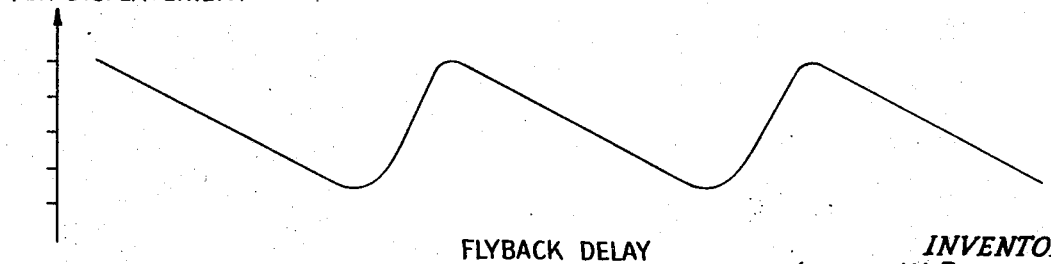
Fig. 17.
INVENTORS.
LUTHER W. RICKETTS, JR.,
ROBERT E. STALCUP,
ROBERT J. ERICKSON and
GEORGE L. BUENGER
BY Woodard, Weikart, Emhardt & Naughton
Attorneys United States Patent Office 3,532,867
Patented Oct. 6, 1970

3,532,867
DELAY CORRELATOR
Luther W. Ricketts, Jr., Urbana, Robert E. Stalcup, Champaign, Robert J. Erickson, St. Joseph, and George L. Buenger, Champaign, Ill., assignors to The Magnavox Company, Fort Wayne, Ind., a corporation of Delaware
Filed Apr. 4, 1966, Ser. No. 540,039
Int. Cl. G06f 15/34
U.S. Cl. 235—181
24 Claims

ABSTRACT OF THE DISCLOSURE

Two separately received signals from a single source are converted to digital form and stored in separate channels, which have provisions for updating the stored signals. Delay means are coupled to the two channels for reading out the channel signals at different times. The delayed signals are applied to a comparator which produces an output indicative of the degree of correlation between the two channel signals.

---

This invention relates generally to correlation techniques and apparatus and more particularly to a correlator which employs a digital processing system.

Varieties of equipment exist for performing correlation functions. One practical application of correlation is found in the analysis of signals transmitted in space or in some signal transmitting medium, for determining the location of the source of signals. For this purpose, signals can be picked up by remote sensors for delay accumulation processes. Signals from a given source will arrive at different times at sensors located different distances from the source.

It is an object of the present invention to provide an improved correlating apparatus.

A further object is to provide a correlator capable of various modes of operation, having a large capacity for handling input information, and which is quite versatile.

A further object is to provide a correlator capable of real-time operation.

A further object is to provide a correlator adaptable to a variety of practical applications and which is not subject to the vagaries of analog inaccuracy.

A further object is to provide a correlator capable of high operating speeds.

A further object is to provide a correlator capable of correlating functions which have undergone a shift in frequency spectrum due to the Doppler effect.

Described briefly, a typical embodiment of the present invention employs two digital signal processing channels, each channel having an input for signals derived from a receptor responsive to signals produced by a signal source. Means are provided in each channel for storing data derived from the signal input thereof, and updating means are provided in each channel for regularly replacing old data in the memory thereof.

Delay means are coupled to the channels so that information simultaneously received at the receptors of the two channels can be read out at correspondingly different times with respect to each other. The channel outputs are coupled to comparator means whereby it is possible to determine at what relationship of read out times the greatest degree of correlation between the memory outputs is obtained.

Means are provided for sweeping through a complete set of time differences, or sweeping through only that portion thereof which might be of principal interest. Means are also provided for compensating for Doppler effects such as could result when there is a different degree of relative movement between a signal source and different receptors of the system.

The full nature of the invention will be understood from the accompanying drawings and the following description and claims:

FIG. 1 is a block diagram of a delay correlator according to a typical embodiment of the present invention, shown in four parts: FIG. 1A, FIG. 1B, FIG. 1C, and FIG. 1D.

FIG. 3 represents the locus of successive values of T which pertain to successive accumulator outputs if two accumulators are used.

FIG. 4 shows a locus of values of T obtainable using one accumulator and gating it such as to obtain the effect of using one accumulator of FIG. 3 part of the time and the other accumulator of FIG. 3 the rest of the time.

FIG. 5 is a basic circuit which is useful to determine whether the sign of T is positive or negative.

FIG. 6 represents the four different possibilities which exist in each scan of the two channels of the correlator, and in which the variables are the sign of T and the order of occurrence of the new-information/old-information (N/O) border in one channel as compared to the other channel and the order of occurrence of the beginning of one channel as compared to the midpoint of the other channel.

FIG. 7 is a logic circuit incorporating that of FIG. 5, but adding components to determine the order of occurrence of the new-old borders.

FIG. 8 adds components to the circuit of FIG. 7 for gating the accumulator to determine when the accumulator is activated.

Figure 9:
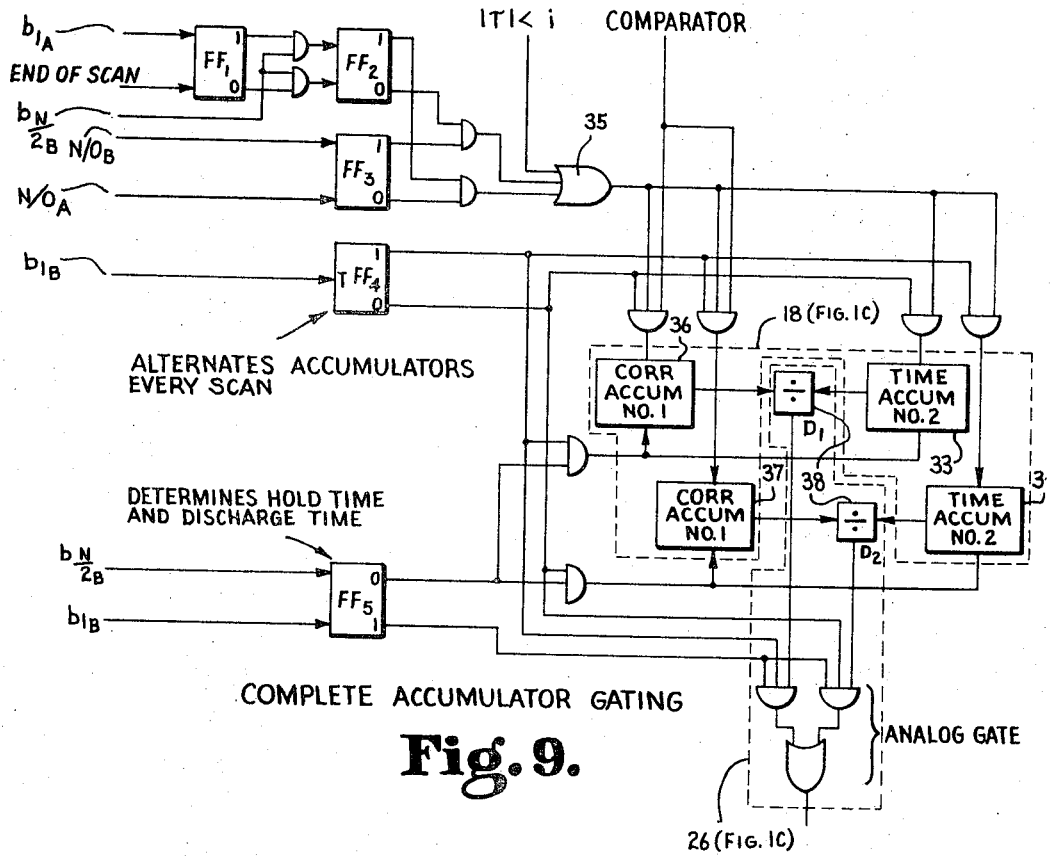

FIG. 9 is a further development of the circuit of FIG. 8 and shows the employment of two accumulators, enabling each one to integrate alternate scans to facilitate accumulator read out and avoid the necessity of incorporation of sample-and-hold circuitry.

FIG. 10 illustrates waveforms pertaining to the circuitry of FIG. 9.

FIG. 11 is a diagram illustrating the memory contents of the two channels of the correlator, as the contents would appear if they had been loaded as a result of a sound source emitting a single frequency and approaching the receptor for one channel at a faster rate than the rate of approach to the receptor of the other channel.

FIG. 12 is a diagram of memory contents derived from the same signal source conditions as in FIG. 11 but compensated for by running the bit clock of the upper channel at a slower rate than the bit clock of the lower channel.

FIG. 13 illustrates an alternate way of correction for frequency differences, and wherein every third bit is repeated in the upper channel.

FIG. 14 is a functional representation of the operation of the channels in the typical embodiment, wherein the B channel has bits repeated therein for Doppler correction and channel A has periodic pauses and "T-shift" holds, to enable the scans in both channels to start together, and provide the precession between channels for T-shifting.

FIG. 15 is like FIG. 14 except that the Doppler correction holds and T-shift holds are applied to the A channel and the periodic pauses are in the B channel.

Figure 16:
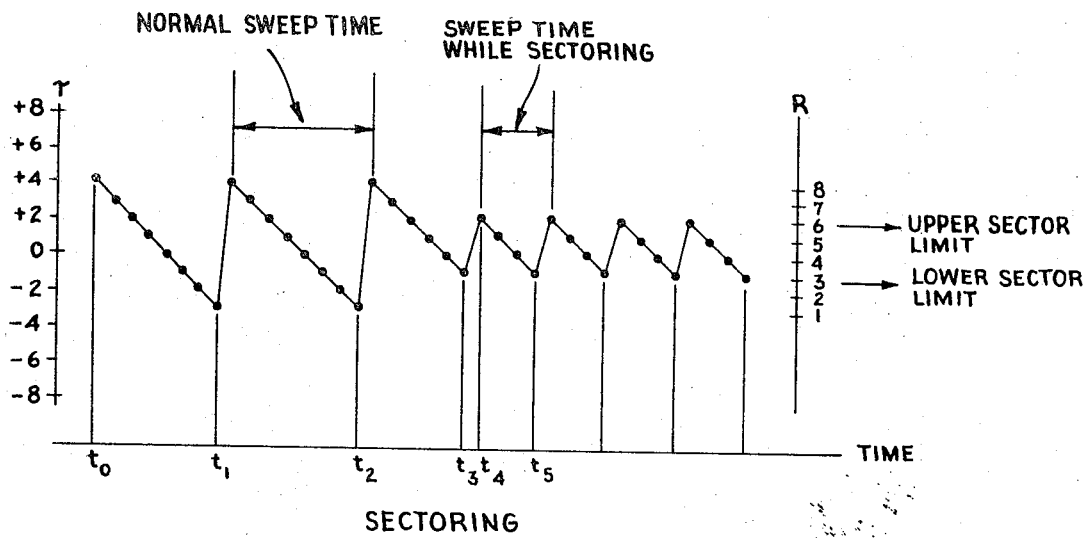

FIG. 16 is a diagram illustrating the "sectoring" feature of the delay correlator, employing variable sweep widths.

FIG. 17 represents a succession of sweeps with "fly-back delays" provided between successive sweeps to permit the return of a mechanical output display device from the end of a sweep stroke to its sweep stroke starting position.

INTRODUCTION

The delay correlator is a device which produces the correlation function of two functions of time; it is specifically used to process data originating in a space having particular geometric properties: Any point within a plane area may be located by specifying a pair of numbers which are the values of a set of coordinates which are non-Cartesian and which are not necessarily perpendicular. If a sound source 11 (FIG. 1A) exists within a specified horizontal plane area for example, one member of the pair of coordinate numbers which give its location may be deduced from the output of a delay correlator device. The source can be pinpointed by the use of a second correlator device which yields the second number of the coordinate pair.

Figure 1A:
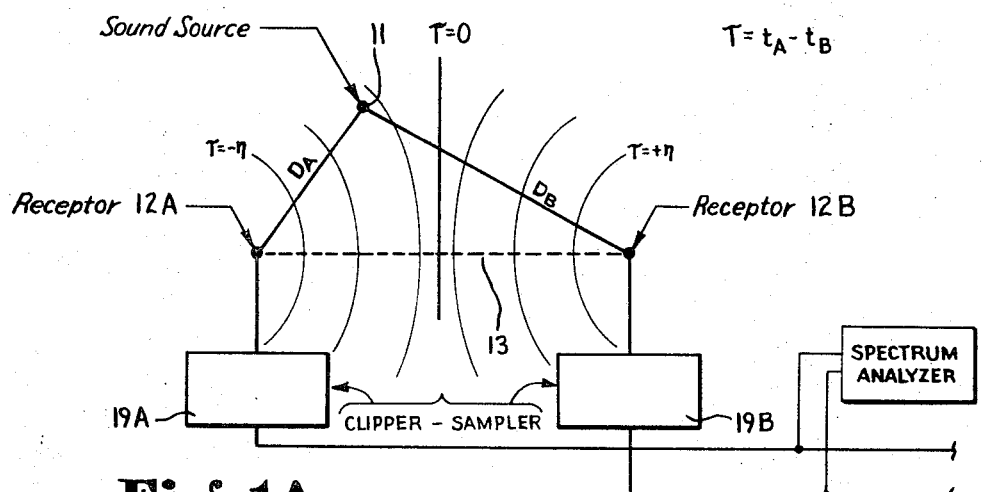

A single delay correlator has two information channels, A and B. As shown in FIG. 1A, the inputs to these channels are from the corresponding receptors, 12A and 12B which are located at the ends of a base line 13 which lies in a plane having isotropic sound propagation characteristics. The transmission lines connecting the receptors to the correlator inputs have "instantaneous" sound propagation characteristics.

A family of imaginary hyperbolas, having the receptors as foci, overlays the plane as shown. Any sound emitted by a sound source within the plane will arrive at receptor A after a time, $t_a$ by traveling along the line $D_A$; the same sound will arrive at receptor B after a time $t_B$, by traveling along the line $D_B$.

The delay correlator measures the time difference $(t_A - t_B) = T$. Since the sound propagation characteristics in the plane are isotropic, the number measured $(t_A - t_B)$, is directly proportional to the distance difference $(D_A - D_B)$. Since each value of the quantity $(D_A - D_B)$, corresponds to a unique hyperbola, the output of the correlator device specifies that member of the family of hyperbolas on which the sound source is located. Since for every value of output, T, there corresponds a unique hyperbola, the hyperbolas may be labeled with the corresponding value of T, as shown in FIG. 1A.

Thus, even though T is derived from the measurement of a time difference $(t_A - t_B)$, it acquires a geometrical significance in which it is used to label a hyperbolic line in a plane, and successive values of T may and do represent discrete values of time in the present invention.

Device implementation

The foregoing procedure is implemented according to a typical embodiment of the present invention as follows: The data present at sensors 12A and 12B are converted to binary form by clipping and sampling and are stored in two independent memories in the same chronological order in which it originally occurred at the input. The data taken at sensor 12A is stored in the memory of Channel A and the data taken at sensor 12B is stored in the memory of Channel B. The data taken at a certain time at sensor 12A is stored in a particular memory location of Channel A and the data taken at the same time at sensor 12B is stored in a particular memory location of Channel B. Thus a certain memory location in one channel which stores information of the same age as a certain memory location in the other channel is herein referred to as a corresponding memory location. Each channel memory contains data which has been present at its input during a certain period such as the preceding 30 seconds, for example. Memory scanning is used and a scan may be defined for this embodiment as the procedure of recalling and examining the entire contents of a memory channel, starting at some particular address, proceeding in sequence through all addresses of the memory, and returning to the starting point. One scan follows another without interruption. While a scan is occurring in one channel, a scan also occurs in the other channel, and during the course of these simultaneous scans, the contents of the two channels are compared at comparator 17 on a bit-to-bit basis in order to assess the degree of correlation existing between the two channels. The COMPARATOR 17 is an EXCLUSIVE NOR circuit whose output is integrated by an ACCUMULATOR 18 during the course of a scan. At the end of the scan, the accumulator contains a quantity proportional to the degree of correlation existing between the two channels.

Although the information contained in corresponding memory addresses of the two channels was taken at the same time, the memory address at which a scan begins may be different for the two channels. Therefore, at the end of a scan, the quantity in the accumulator is proportional to the correlation between functions comprised of events which were separated in time by an amount proportional to the separation between the initial memory addresses of the scan. This initial address separation (IAS) is semi-controllable and is one output of the correlator device. The other output is the accumulator output. Once each scan, at the end of the scan, these outputs form a pair of numbers, one of which locates a hyperbola on which a point of interest in an output space is located. One member of this pair is the IAS which corresponds to a unique value of T and thus to a unique hyperbola of the input space. The other is the degree of correlation existing along the particular hyperbola designated by the first number. If, in observing the output space, the operator detects a high degree of correlation, he may also observe the value of T at which that correlation occurred and he may deduce that a sound source is present on the hyperbola corresponding to that value of T.

Change of T

Two additional considerations are involved in the processing of data by the delay correlator. One of these involves the changing of the IAS between each scan so as to proceed in an orderly manner through all possible values of T. Inasmuch as the memory content, when recalled, consists of a pulse train produced by clipping and sampling at 19A and 19B the analog data present at the receptors, it follows that the minimum resolution of T corresponds to a change in the IAS of one memory bit. If the IAS is changed by one bit after each scan, then after the elapse of a number of scans equal to the number of bits in the memory, all possible values of T will have been examined. Of the many possible and arbitrary ways to proceed through all values of T, the following procedure is technically easy to implement and is an example of a SWEEP:

In this example, a sweep may consist of as many scans as there are bits in the memory and the first scan of a sweep may have an IAS pertaining to the most positive value of T. In each subsequent scan of the sweep, the value of T is reduced by one. The last scan of the sweep is that whose IAS pertains to the most negative value of T. Thus, the output space is three dimensional, and two of its coordinates have already been mentioned: a value of T and the corresponding correlation. The third is concerned with time and the manner in which T changes during the course of a sweep.

If it is deemed unnecessary to proceed through all values of T which would be possible with a memory of a certain capacity, the number of scans in a sweep can be less than the total number of bits in the memory. The output is recorded on a paper strip 21. The movement of the strip is in the direction of arrow 22 and is a linear function of time. During the course of a sweep, T also changes as a linear function of time; the instantaneous value of T determines the position of a recording pen which moves as indicated by arrows 24 perpendicularly to the direction of movement of the strip. One traverse of the pen across the strip occupies as much time as one sweep, hence the name. Finally, the degree of correlation pertaining to each value of T works through pen intensity controller 26 and is recorded as the intensity emitted by the pen. An example of a device of this type is the Alden Helical Recorder, Model RD-235A/TLR-28.

Loading

The second consideration involved in the processing of data by the delay correlator is concerned with the changing of the memory contents. If the memory content were static, a single sweep would yield valid information because each scan of the sweep pertains to a different value of T. However, if the memory content remained static while a second sweep occurred, the second sweep would be a repetition of the first and no new information would be forthcoming. It is therefore imperative that the memory content change in accordance with the real-time rate of change of analog information at the receptors. This is accomplished by address precession in which the memory address containing the oldest information is loaded with new information, while that which was previously present is discarded. In one mode of operation the loading rate is such that the memory content has been replaced exactly once during the course of a sweep, but this synchronous coincidence is by no means obligatory; the loading rate and the rate of change of T may proceed quite independently; if but one bit of the memory changes during a sweep, the second sweep still has new information to process, rendering the second sweep non-redundant with respect to the first; and at the end of a sweep, the value of T attained at that time is maintained for several scans to allow the recorder pen to fly back, but during this time, memory loading continues uninterrupted.

Simplified examples

An explanation will now be given of the manner in which loading and T changing is accomplished. For purposes of visualization these examples employ a greatly simplified memory in which there are but eight addresses, each address having but one bit. The actual memory may have many addresses with many bits per address.

The scan

Table 1 is a series of rows of numbers to illustrate the concept of a scan. Each row represents a random scan, unrelated to the others. Each number in a row represents an address number. Note that each scan starts with some arbitrary address, proceeds in uninterrupted sequence through all addresses of the memory, and ends just short of the starting point. Inasmuch as a scan is a time-consuming process, the horizontal scale may be interpreted either as time or as displacement of memory examining position or both.

TABLE 1.—THE SCAN

| Address Numbers | 6 | 7 | 8 | 1 | 2 | 3 | 4 | 5 |
|---|---|---|---|---|---|---|---|---|
| | 3 | 4 | 5 | 6 | 7 | 8 | 1 | 2 |
| | 1 | 2 | 3 | 4 | 5 | 6 | 7 | 8 |

One scan

Ways of loading

Tables 2, 3, 4, and 5 employ the concept of a scan to show how loading is accomplished. In these figures, the subsequent scans shown follow one another in time and are therefore not random. In Table 2, each scan is represented by a double row of numbers. The upper row represents the address number, as in Table 1. The lower row indicates the age of the information contained in the address whose number appears immediately above each number of the lower row. The greater the magnitude of each number of the lower row, the newer is the information it represents. One thing which is arbitrary about Table 2 is that each scan always starts with the same particular address. In this scheme, loading is accomplished at the rate of one new bit each scan. Note that in each scan the newest bit is one unit newer than the age of the newest bit of the previous scan and that it is loaded into an address where it replaces the oldest bit of the previous scan. In each scan, all memory addresses are examined in sequence, and, in an analogous manner to this, the address being loaded sequences through the memory, but at a much slower rate: This phenomenon proceeds at the rate of one address per scan. This procedure gives rise to an imaginary border between the newest and oldest information as indicated by the vertical slash in the lower rows of numbers in Tables 2, 3, 4 and 5. This imaginary border moves through the memory as subsequent scans occur.

TABLE 2: LOADING

```
ADD. NO.   1 2 3 4 5 6 7 8|     SCAN 1   ADDRESS
INFO. AGE  1 2 3 4 5 6 7 8|             BEING LOADED
           Old         New                   8

ADD. NO.   1 2 3 4 5 6 7 8      SCAN 2       1
INFO. AGE  9|2 3 4 5 6 7 8
           New| Old

ADD. NO.   1 2  3 4 5 6 7 8     SCAN 3       2
INFO. AGE  9 10|3 4 5 6 7 8
           New | Old

ADD. NO.   1 2  3  4 5. 6 7 8   SCAN 4       3
INFO. AGE  9 10 11|4 5. 6. 7 8
           ·New   | Old

ADD. NO.   1 2  3  4  5 6 7 8   SCAN 5       4
INFO. AGE  9 10 11 12|5 6 7 8
                  New| Old

ADD. NO.   1 2  3  4  5  6 7 8  SCAN 6       5
INFO. AGE  9 10·11 12 13|6 7 8
                     New| Old
```

The following Tables 3 and 4 are variations of the loading procedure shown in Table 1. In Table 3, the loading rate is two bits per scan. In this case, every time loading occurs, the two oldest bits are discarded and two new ones put in their place. In Table 4, the loading is one bit every two scans. In this case, when loading occurs, only one bit is loaded and the scan following a load scan is identical to the previous one.

ALTERNATE LOADING, 1   TABLE 3

```
ADD. NO.    3  4  5  6  7  8  1  2                ADDRESSES
INFO. AGE  |9 10 11 12 13 14 15 16|              BEING LOADED
           |Old                New|                  1, 2

ADD. NO.    3  4  5  6  7  8  1  2
INFO. AGE  17 18|11 12 13 14 15 16                   3, 4
           New|Old

ADD. NO.    3  4  5  6  7  8  1  2
INFO. AGE  17 18 19 20|13 14 15 16                   5, 6
              New|Old

ADD. NO.    3  4  5  6  7  8  1  2
INFO. AGE  17 18 19 20 21 22|15 16                   7, 8
                    New|Old

ADD. NO.    3  4  5  6  7  8  1  2
INFO. AGE |17 18 19 20 21 22 23 24|                  1, 2
          |Old                 New|

ADD. NO.    3  4  5  6  7  8  1  2
INFO. AGE  25 26|19 20 21 22 23 24                   3, 4
             New|Old
```

TABLE 4.
ALTERNATE LOADING, 11

```
ADD. NO.    6  7  8  1  2  3  4  5               ADDRESSES
INFO. AGE  10 11 12| 5  6  7  8  9                BEING LOADED
               New| Old                               8

ADD. NO.    6  7  8  1  2  3  4  5
INFO. AGE  10 11 12 13| 6  7  8  9                    --
                  New| Old

ADD. NO.    6  7  8  1  2  3  4  5
INFO. AGE  10 11 12 13| 6  7  8  9                    1
                  New| Old

ADD. NO.    6  7  8  1  2  3  4  5
INFO. AGE  10 11 12 13 14| 7  8  9                    --
                     New|Old

ADD. NO.    6  7  8  1  2  3  4  5
INFO. AGE  10 11 12 13 14| 7  8  9                    2
                     New|Old

ADD. NO.    6  7  8  1  2  3  4  5
INFO. AGE  10 11 12 13 14 15| 8  9                    --
                        New|Old
```

The following Table 5 shows a combination of the techniques of Tables 3 and 4: When loading occurs, more than one bit is loaded; however, loading occurs less often than once per scan. This method resembles what actually happens in the memory channels of the present invention embodiment illustrated.

ALTERNATE LOADING, 111
TABLE 5

```
ADD. NO.    4  5  6  7  8  1  2  3               ADDRESSES
INFO. AGE  12 13 14 15| 8  9 10 11               BEING LOADED
               New| Old                               --

ADD. NO.    4  5  6  7  8  1  2  3
INFO. AGE  12 13 14 15 16 17|10 11                   8, 1
                       New|Old

ADD. NO.    4  5  6  7  8  1  2  3
INFO. AGE  12 13 14 15 16 17|10 11                    --
                       New|Old

ADD. NO.    4  5  6  7  8  1  2  3
INFO. AGE  12 13 14 15 16 17 18 19|                  2, 3
           Old                New|

ADD. NO.    4  5  6  7  8  1  2  3
INFO. AGE  12 13 14 15 16 17 18 19|                   --
           Old                New|

ADD. NO.    4  5  6  7  8  1  2  3
INFO. AGE  20 21|14 15 16 17 18 19                   4, 5
             New|Old

ADD. NO.    4  5  6  7  8  1  2  3
INFO. AGE  20 21|14 15 16 17 18 19                    --
             New|Old

ADD. NO.    4  5  6  7  8  1  2  3
INFO. AGE  20 21 22 23|16 17 18 19                   6, 7
                  New|Old
```

In each of the Tables 2, 3, 4 and 5, the initial address of the scans is purposely made different to show that this is an arbitrary quantity. Similarly, the age of an information bit is but randomly related to the address number in which that bit is contained, except that once a relationship is established, both quantities increase systematically.

Correlating

The methods outlined in Tables 2, 3, 4 and 5 pertain to *each* of the individual channels of the correlator. Understanding of the overall device operation requires consideration of the simultaneous happenings in each channel. This is illustrated in Table 6, which also introduces several additional concepts.

In Table 6, each scan is represented by five rows of numbers. The first and second rows pertain to Channel A and the third and fourth rows pertain to Channel B.

The first row is the address number of Channel A and the second row is the corresponding information age. These two rows correspond to the two rows per scan shown in Table 2. The third row is the address number of Channel B and the fourth row is the corresponding information age. These two rows also correspond to the two rows per scan shown in Table 2, but they pertain to the second channel. The fifth row gives a value of T and will be explained later. The five row scans of Table 6 follow one another in the sequence shown.

TABLE 6: DELAY CORRELATOR OPERATION $$T = R - \frac{N}{2}$$

```
CHANNEL  ADDRESS   1  2  3  4  5  6  7  8
   A     AGE      |1  2  3  4  5  6  7  8|
                               ↑                  SCAN 1    T    R
CHANNEL  ADDRESS   1  2  3  4  5  6  7  8                   ↓    ↓
   B     AGE      |1  2  3  4  5  6  7  8|                  0    4
                  |           0           |

8  1  2  3  4  5  6  7
                   8  9|2  3  4  5  6  7
                          ↑                       SCAN 2
                   1  2  3  4  5  6  7  8
                   9|2  3  4  5  6  7  8
                  -1|+7|      -1                           -1    3

7  8  1  2  3  4  5  6
                   7  8  9 10|3  4  5  6
                            ↑                     SCAN 3
                   1  2  3  4  5  6  7  8
                   9 10|3  4  5  6  7  8
                  -2  |+6|     -2                          -2    2

6  7  8  1  2  3  4  5
                   6  7  8  9 10 11|4  5
                                ↑                 SCAN 4
                   1  2  3  4  5  6  7  8
                   9 10 11|4  5  6  7  8
                    -3   |+5 |  -3                         -3    1

5  6  7  8  1  2  3  4
                  |5  6  7  8  9 10 11 12|
                            ↑                     SCAN 5
                   1  2  3  4  5  6  7  8
                   9 10 11 12|5  6  7  8
                  |   -4    |   +4    |                    +4    8

4  5  6  7  8  1  2  3
                  12 13|6  7  8  9 10 11
                       ↑                          SCAN 6
                   1  2  3  4  5  6  7  8
                   9 10 11 12 13|6  7  8
                   +3  |  -5  | +3                         +3    7
```

If the third and fourth rows of the scans of Table 6 are isolated and examined, it can be seen that they comprise a replica of Table 2. The behavior of Channel B is therefore identical to that of Table 2. EVERY scan begins with the *first* address of Channel B and continues through the entire B memory. For this reason, Channel B is called the fixed channel. Loading of Channel B is identical to that shown in Table 2.

In Channel A, the number of the first address of each scan is reduced by one for each scan; this is done by allowing the first address of each scan to be the same as the last address of the preceding scan, and is accomplished simply by NOT advancing the address counter of Channel A for the first address of each scan.

Information received at a particular time at receptors A and B is loaded into identical addresses of the A and B memory channels. Thus, the information found in corresponding addresses of the two channels is always of the SAME AGE even though the INFORMATION ITSELF is necessarily different because it was present at different receptors.

Determining T

In the table, the fifth row, T, is obtained by subtracting every number in the fourth row from the corresponding number of the second row. This procedure yields T because, as was stated earlier, T *is* the time difference $(t_A - t_B)$. But $(t_A - t_B)$ is equal to the age difference of the information of the two channels.

Border Effects

Examination of the fifth row shows that each scan is, in general, divided into three regions, and that there are, in general, two values of T per scan. If one value of T is found in the inner region, the other value is found in the two outer regions. The scan is separated into these regions by the following markers; the beginning of the scan, the end of the scan, the new/old border of Channel A and the new/old border of Channel B. For each of the two values of T which occur in a scan, the correlation is valid only when the comparator 17 is examining those bits which lie within the region pertaining to that value of T. Therefore, a person has the option of declaring one of the two values of T which occur in each scan to be invalid and using the above mentioned markers (as inputs to gates of FIG. 9, for example) to gate the accumulator on when the comparator is in the region pertaining to the valid value of T and off when it is in other regions, this being the preferred procedure or; of having two accumulators, each of which performs correlations within the regions pertaining to one of the two T values. If the latter course were chosen, the same markers would be used for gating and one of the accumulators has gate-on and gate-off signals identical to those of the single accumulator of the former case, while the gate-on and gate-off signals of the second accumulator are just the reverse of those of the first.

Choosing Valid T

Figure 2:
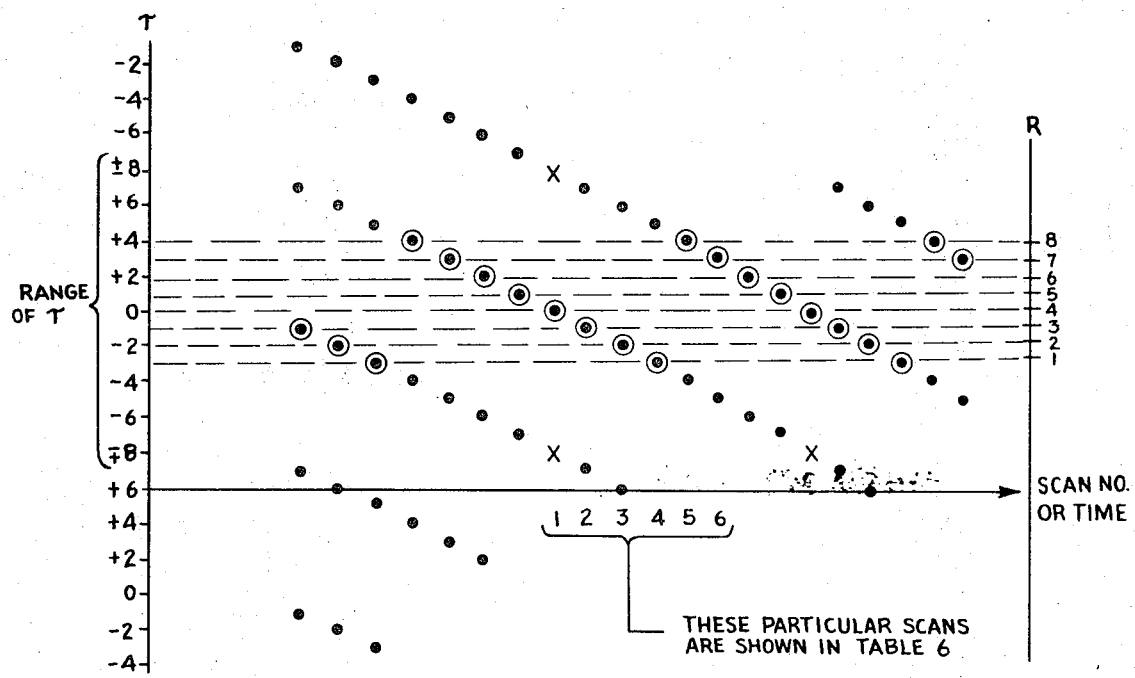
FIG. 2 is a graph on which the horizontal scale is representative of time or scan number, and on which the vertical scale denotes values of the storage time difference T between information read out of one channel and that read out of another channel at a scan.

FIG. 2 is a graph whose horizontal scale is scan number or time and whose vertical scale is the values of T available at each scan. Those scans shown in Table 6 are explicitly pointed out. T is shown on a never-ending repeating scale which actually has only 2N unique values, where N is the number of bits of the memory (in this case $N=8$ and $2N=16$). The range of T is, as shown, $-N$ to $+N$.

If the option of using two accumulators were chosen, FIG. 3 shows the locus of successive values of T which pertain to successive accumulator outputs. It is seen that the two values of T are always separated by N values and that each starts at $T=+N$ and works itself down to $T=-N$. As can be seen with the help of Table 6 primarily, and FIG. 2, as T assumes values away from $T=0$, the number of bits of valid correlation decreases, until, when T is as far from $T=0$, as possible, i.e., $T=+N=-N$, the number of valid correlation bits has become zero. These points are shown by the crosses on FIG. 3.

In the preferred embodiment of the delay correlator, the option of using only one accumulator is chosen and its gating times are such as to obtain those values of T which are shown circled in FIG. 2. This has the effect of using accumulator #1 (of FIG. 3) part of the time and accumulator #2 (of FIG. 3) the rest of the time. The result is shown in FIG. 4, and the accumulator gating is described hereinafter.

By arbitrarily selecting those T values shown in FIG. 4, the range of T has been cut in half to $$\left(-\frac{N}{2}+1\right) \leq T \leq \left(+\frac{N}{2}\right)$$

but the T values which remain have correlation values which were accumulated over at least half the memory contents. Furthermore, by regarding $T=0$ as a negative number, equal numbers of positive and negative values of T as a function of time (or scan number) is now a nonambiguous, single-valued function.

In Table 6, those values of T which are used to form FIG. 4 are entered in a T column, one entry per scan. Each entry is one of the two T values available during that scan and the valid region is the larger one.

The procedure of gating the single accumulator on and off so it will be active only in the above mentioned regions will be described later.

"R" Column

In Table 6 a column marked "R" parallels the column of T values. There is a one-to-one correspondence between values of T and R such that $$T = R - \frac{N}{2}$$

An R scale is also shown in FIG. 4, on the right. R has the range $1 \leq R \leq N$. R is a useful tool in computing T because R is always positive, whereas T is not. R can be directly obtained from the memory address counters as follows:

Bit number $N/2$ of Channel B scan is designated as an indicator bit. The indicator bit is represented in Table 6 by an arrow above address 4, of the B Channel memory row in each scan. In the course of each scan, when the indicator bit occurs, the address counter of Channel A is examined, and the number contained therein is transferred to an R register; the number in the R register can be reduced by $N/2$ to yield the value of T pertaining to that scan.

For example, in Table 6, during scan 2, when bit 4 occurs in Channel B, the address counter of Channel A contains the number, 3; 3, is the value of R pertaining to that scan and the corresponding value of T is:

$$T = R - \frac{N}{2} = 3 - 4 = -1$$

Inasmuch as R and T are linearly related, it is a simple matter to drive the T-axis input 28 of a display device by connecting a $D/A$ ladder to the stages of the R register.

Accumulator Gating

In order to gate the accumulator on and off in the valid regions, it is necessary to know whether T is positive or negative. This information can be had by noting in each scan of Table 6 which of the following two bits occur first; the first bit of Channel A $(b_{1A})$ or the indicator bit of Channel B $\left(b_{\frac{N}{2B}}\right)$ If $b_{1A}$ occurs first, T is negative and if $$b_{\frac{N}{2B}}$$

occurs first, T is positive. This can be realized logically with the circuit 29 of FIG. 5, in which $$b_{\frac{N}{2B}}$$

samples the output of a flip-flop which is set by $b_{1A}$ and reset at the end of a scan; this sampled output is stored in a second flip-flop, whose output ("1" if T is negative, "0" if T is positive), at the end of a scan, is a proper indication of the valid sign of T for the scan just completed.

Two bits of information are required to determine whether the accumulator shall be active during the inner or outer region of a scan. One of these, the sign of T, has just been derived. The other is the order of occurrence, within each scan, of the two new-old borders $N/O_A$ and $N/O_B$. The four cases which these two variables may assume are shown in FIG. 6. FIG. 6 shows scans in which the numbers are omitted and only the four following pertinent markers are shown: the two new-old borders $$b_{1A} \text{ and } b_{\frac{N}{2B}}$$

The results of FIG. 6 are summarized in the truth table of Table 7. With reference to FIG. 6, one must first determine the sign of the valid T by noting the order of occurrence of $$b_{1A} \text{ and } b_{\frac{N}{2B}}$$

The order of occurrence of the new-old borders determines which sign of T shall be assigned to which region. Since only one of these signs is valid, as determined by the first comparison $$\left(\text{order of occurrence of } b_{1A} \text{ and } b_{\frac{N}{2B}}\right)$$

one must note in which region the valid sign lies, as determined by the second comparison (order of occurrence of new-old borders). The region so selected is the one in which the accumulator is caused to be active.

FIG. 6 shows only cases in which there are three regions per scan; sometimes there is but one or two regions per scan. In all cases, the first region to occur is defined as the outer one.

Determination of the active region can be made by the circuits of FIG. 7 which includes the sign of T circuit of FIG. 5. An added flip-flop, FF3, determines the order of occurrence of the new-old borders: If, at the end of a scan, FF3 contains a "1", then the $N/O_A$ occurred before the $N/O_B$ in that scan. This is because $N/O_B$ inserts a "1" into FF3 which means $N/O_B$ was the last of the two borders to occur, and therefore $N/O_A$ must have occurred before $N/O_B$. The remaining additional circuitry of FIG. 7 performs the exclusive nor function as indicated by Table 7.

TABLE 7—TRUTH TABLE

```
  "1" if T IS NEGATIVE (b_{1A} OCCURS BEFORE b_{N/2 B})

"1" if N/O_A OCCURS BEFORE N/O_B

"1" if INNER REGION IS VALID 1     0     0
  0     0     1
  0     1     0
  1     1     1
```

It must be emphasized that the final output of FIG. 7 is valid only at the end of a scan because it depends on events which may occur at any time right up to the end of the scan. There are long periods of time in which subsequent scans have valid T values which are all of the same sign, i.e., for $N/2$ scans T will be positive; then T will suddenly become negative and will stay negative for the next $N/2$ scans. It is only when T changes signs every $N/2$ scans that the state of FF2 (FIGS. 5 and 7) will change. This happens at two places: when T changes from its most negative value to its most positive (e.g., between scans 4 and 5 of Table 6) and when T passes through $T=0$ (e.g., scan 1 of Table 6). When T is removed from either of these two points, then a study of the situation will verify the following statements:

(1) During a period of several subsequent scans a situation is considered in which the sign of T is not a variable. Therefore, only the order of occurrence of the new-old borders is a factor in determining accumulator activation times.

(2) The occurrence of either new-old border marks the entrance into or the exit from a valid region.

(3) Although the valid region can be designated as the inner or outer region according to the criterion generated by the circuit of FIG. 7, an equivalent method of designation is to say that it is that region which follows the new-old border of a particular channel. To illustrate an example of this statement, reference is made to FIG. 6. In the second and third cases of FIG. 6, the valid T is positive only and may be neglected as a variable. In these two cases, although the "innerness" and "outerness" of the valid regions are different, it is true that the valid region is always that which follows the new-old border of channel $B(N/O_B)$. Similarly, in the first and fourth cases of FIG. 6, the valid T is always negative and the valid area is always that which follows $N/O_A$.

(4) A person may properly activate the accumulator by noting what the sign (here considered to be a nonvariable) of T actually is, then using the new-old border of one channel to turn on the accumulator and the new-old border of the other channel to turn it off. When the sign of T reverses, every $N/2$ scans, then the roles of the new-old borders, in turning the accumulator on and off, are also reversed. If the complement of the output of the circuit of FIG. 7 is used to activate the accumulator, then these things are done.

Improper Accumulator Gating

The above considerations properly activate the accumulator when T is far from the points at which it changes signs. When T is near the points where it changes signs, one or two scans may occur during which the output of the circuit of FIG. 7 is improper. These cases are handled as follows: When T changes signs from its most negative to its most positive value, correlation is occurring in that part of the area under surveillance by the delay correlator which is farthest from the center of the area of surveillance and the recording device 23 is writing at one extreme edge of its paper and is preparing to jump to the other extreme edge. Furthermore, in these circumstances, the number of memory bits over which correlation is occurring is a minimum and the output of the correlator is most likely to be inaccurate. Therefore, when T is changing from its most negative value to its most positive, errors generated by the circuit of FIG. 7 are allowed to persist because these errors exist in areas which are of least interest and will, for large memories, occupy but a very small percentage of the total output display.

The other point of possible error occurs when T is near $T=0$. This is handled by activating the accumulator during each entire scan rather than using the output of the circuit of FIG. 7 to activate it. This does not result in much of an error, because when T is near $T=0$, correlation occurs over almost the entire memory and adding the correlation of the invalid region does not alter the final output greatly. There are other reasons to be discussed later, for correlating over the whole scan when T is near zero. It is easy to generate a signal which is "1" when the absolute value of T ($|\tau|$) is less than some number, $i$, where $i$ is a small percentage of N. This signal is OR'd with the complemented output of the circuit of FIG. 7. The complemented output is formed by changing the EXCLUSIVE NOR to an EXCLUSIVE OR as shown in the completed accumulator gating circuit of FIG. 8. This modified EXCLUSIVE OR determines when the accumulator is activated, at which time it integrates the comparator output.

Figure 1B:
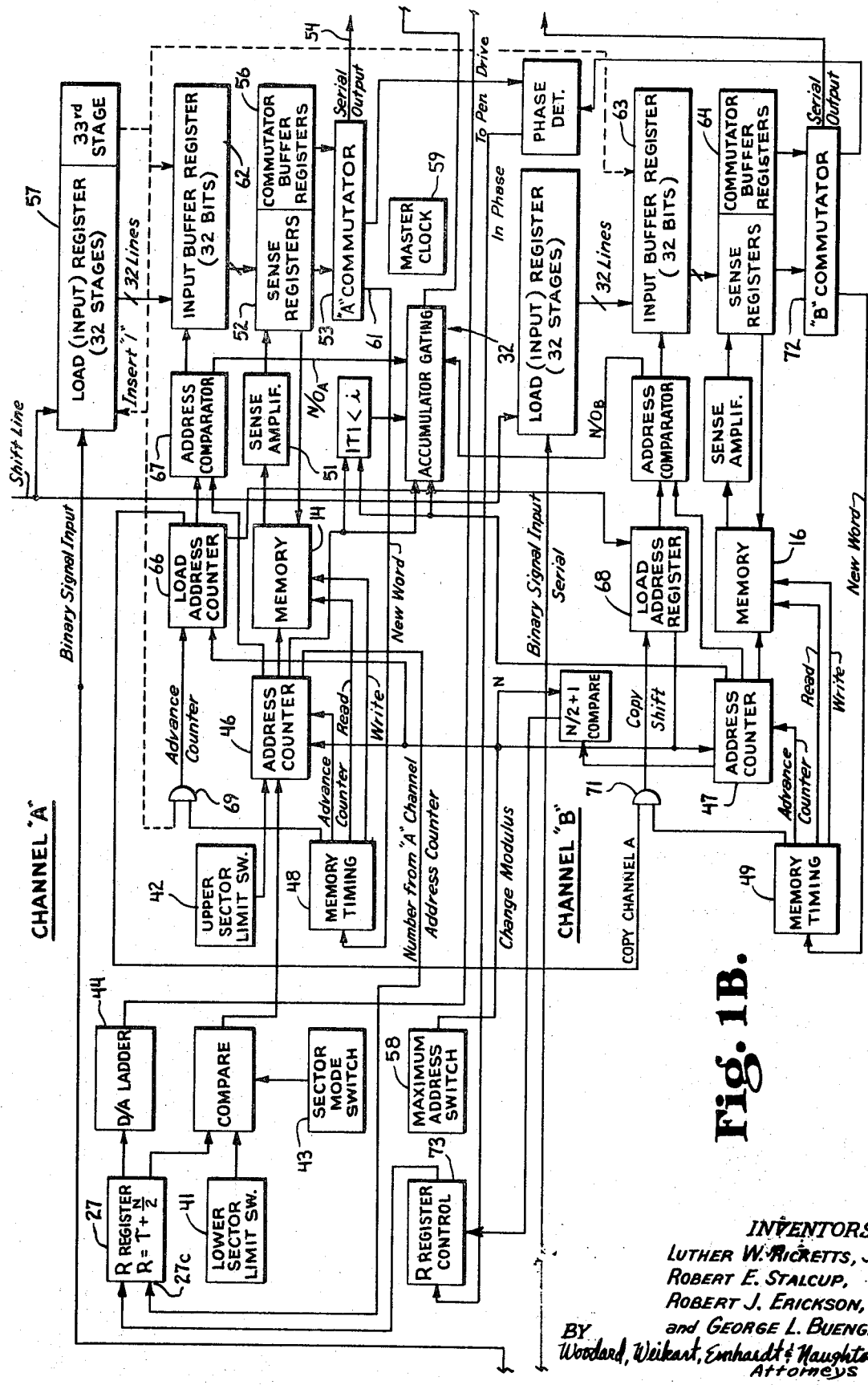

So when the counts on the address counters indicate that $|\tau|<i$, a "1" is produced on the $i$ input to the OR gate 35 (FIG. 9) from the $|\tau|<i$ comparator (FIG. 1B), and the accumulators can be activated thereby regardless of the state of the other inputs to the OR gate.

Accumulator Redundancy

The accumulator output increases during the course of a scan, and only at the end of a scan has it attained a valid value. In order to present this valid, end-of-scan output to a display device, the value thus attained must either be held in the accumulator long enough for readout, or it must be transferred to a sample-and-hold circuit. It is simpler to hold it in the accumulator, but this procedure gives rise to a problem in that while the value is being held, a new scan has already begun and the accumulator is unable to integrate over the new scan because it is holding the value attained from the previous scan. For this reason, two accumulators are used, each one integrating alternate scans; the two accumulators 36 and 37 are used simply to eliminate a small-aperture sample-and-hold circuit—they are NOT the two accumulators mentioned in a previous scheme in which one accumulator was active in the inner region and the other in the outer. Another reason for using two accumulators is that a finite time is required to discharge (or reset) the accumulator. This discharge time eats into the next scan, when the accumulator should be integrating. The extra accumulator is added to the circuitry of FIG. 8, which is amended as shown in the complete accumulator gating and output circuit of FIG. 9. FF4 is toggled once per scan to switch from one accumulator to the other. FF5 is toggled every half-scan to cause the inactive accumulator to hold its value for the first half-scan and to discharge during the second half-scan. An analog AND/OR gate applies to a common output, the output of whichever accumulator is holding its value. This AND/OR gate is controlled by both FF4 and FF5.

Normalization

In addition, a normalization procedure is effected by the introduction of two more accumulators 33, 34 which integrate the time of activation of the main correlation accumulators 36 and 37. This is necessary because the number of bits per scan which are compared is not the same for each scan. Analog dividers 38 then take the ratio of the outputs of the correlation accumulators to the outputs of the time accumulators to give a normalized output. It is the outputs of these dividers which forms the final normalized correlation outputs which are alternately sampled to yield successive correlation values. The waveforms pertaining to FIG. 9 are shown in FIG. 10.

Effects of Doppler Shift

Figure 1D:
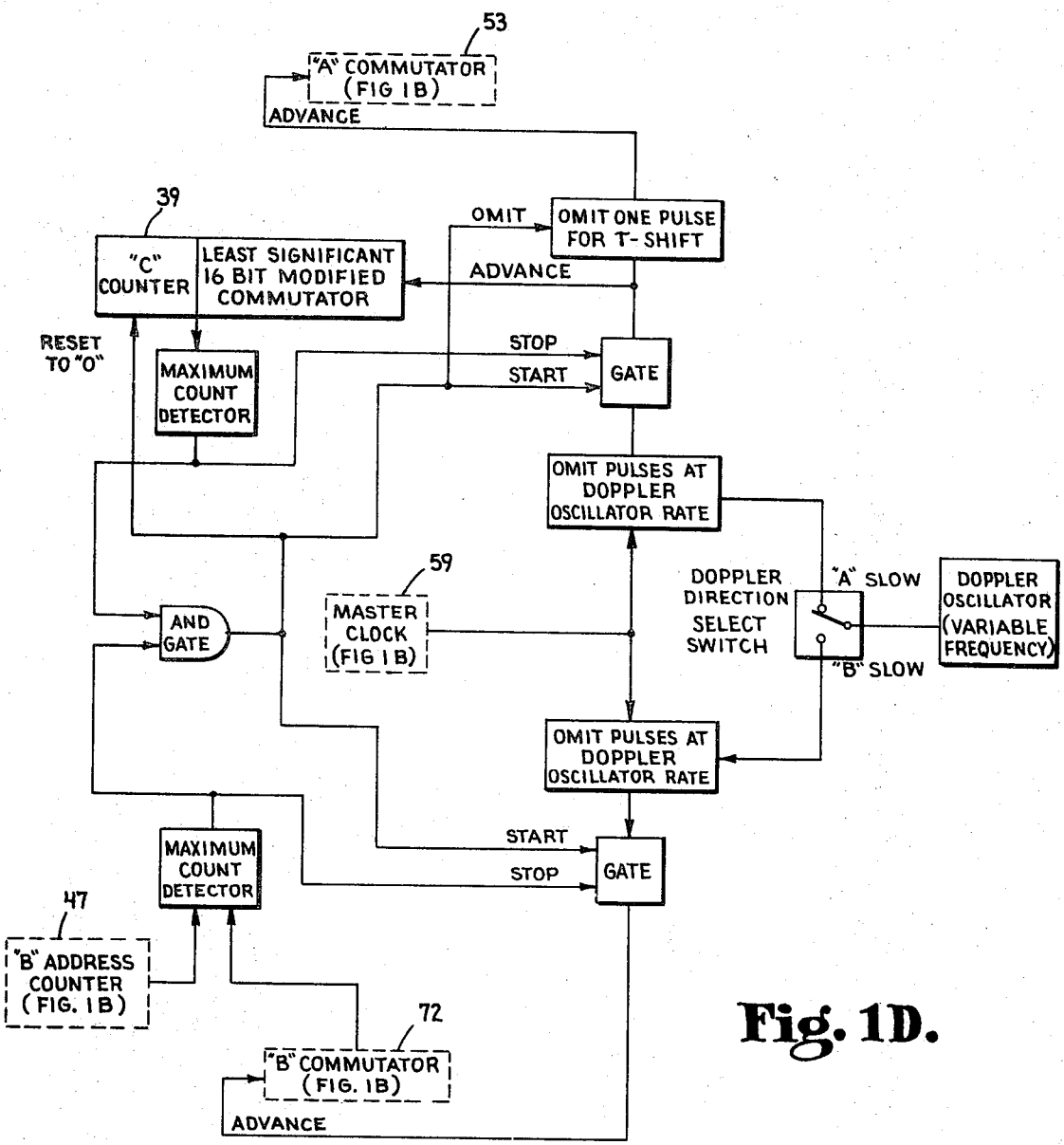

A moving sound source in the field of surveillance may give rise to chaotic correlation if there exists a difference in the radial components of velocity between the source and the two receptors. This is caused by an expansion of the frequency scale of the spectrum seen by one of the receptors with respect to the scale of the spectrum seen by the other. FIG. 11 shows the memory contents of the two channels as they would appear if they had been loaded as a result of a sound source emitting a single frequency and approaching the A channel receptor 12A at a faster rate than the B channel receptor 12B. The memories are here represented as being much longer than the eight bit memories of previous examples. The correlation here is very poor because of the frequency shift between receptors, even though a single sound source is represented. The correlation can be greatly improved if, in reading the memories, the bit clock of Channel A is run at a slower rate than that of Channel B. The effect of this procedure is shown in FIG. 12. An alternate way of improving the correlation is to not change the bit clock rate of Channel A, but rather to periodically repeat bits. This is shown in FIG. 13, where every third bit is repeated. The latter alternative is used in the typical embodiment of the delay correlator, to eliminate clock phasing problems, and is done by periodically deleting a clock pulse from the Channel A clock signal, whereby the same bit is considered for two bit periods during readout. Since bits are repeated in the course of a scan in one channel and not in the other, it is apparent that one channel will reach the end of a scan before the other. When this happens, the readout of the faster memory (the one with unrepeated bits) is halted until the slower memory arrives at the end of its scan; at this time, memory "A" is held up by one bit to effect the normal once-per-scan T-Shift and the two memories are restarted together. FIGS. 14 and 15 each represent several continuous scans when the Doppler mode is implemented. In 14, Channel B has periodically repeated bits which cause Channel A to finish its scan early; Channel A is stopped until B finishes its scan; Channel A has ONE repeated bit at the end of the scan to effect T-shift; then the two channels are restarted together. A variable frequency oscillator, called the DOPPLER OSCILLATOR (FIG. 1D) determines the rate at which bits are repeated. The person operating the delay correlator device must manually set the frequency of the Doppler oscillator in accordance with the frequency scale expansion of the spectrum of one channel with respect to that of the other. He may be aided in this setting by observing simultaneously the spectra of the individual channels and adjusting the Doppler oscillator until they coincide. Auxiliary equipment such as a spectrum analyzer can be employed for this purpose. In FIG. 15, the Doppler oscillator causes bits to be repeated in Channel A and it is B which finishes each scan early. But Channel A also still has the normal end-of-scan repeated bits for T-shifting; this is a separate procedure from the holds induced by the Doppler oscillator and ALWAYS occurs in Channel A, even in the non-Doppler mode.

C-Counter

In order to restart the channels together at the beginning of each scan, when in the Doppler mode, it is necessary to keep the channel which finishes early stopped for the correct number of bits. To accomplish this, a third counter, called the C-counter 39 is introduced to the system. This counter has the same capacity as the address counters of both channels. The C-Counter is caused to run in synchronism with the "A" channel, but it starts its count together with the "B" channel such that a maximum count in the C-Counter occurs when the "A" channel reaches its end-of-scan; at this time, the two channels are restarted together if the "A" channel is the slower channel, or the "A" channel is stopped if the "B" channel is the slower channel. The C-Counter has the effect of counting the number of times that bits are repeated in the slow channel for each scan; then the fast channel is caused to be stopped for the same number of bits at the end of its scan.

Sectoring

A feature known as "sectoring" is incorporated in the delay correlator. This feature allows a variable sweep width so that upper and lower limits are imposed on the observed values of R (or T). This feature is used if it is desired to observe the local movements of a sound source of interest without waiting for an entire sweep to occur.

R decreases monotonically at the rate of one value per scan. If the lower sector limit is set on a switch 41, the instant when R reaches its lower limit can be detected by comparing the switch setting with the R register. This is a signal that on the next scan R should go, not to its next lower value, but rather, it should jump to that value determined by the setting of an upper sector limit switch 42.

Since in normal operation the value of R is determined by observing the address of Channel A when the indicator bit of Channel B occurs, it becomes possible to FORCE a particular value of R by SETTING the address counter of Channel A when the indicator bit of Channel B occurs. This procedure is followed to set the value of R to the upper sector limit in the memory word cycle following the one in which the lower limit is detected. When the value of R is set to the upper sector limit, normal operation is resumed until the lower sector limit is once again reached.

FIG. 16 shows how sectoring occurs. It is a modified version of FIG. 4. The first several sweeps of FIG. 16 are identical to those of FIG. 4; a normal sweep time is $(t2-t1)=(t1-t0)=$, etc.

At some time between $t2$ and $t3$, the operator throws the sector mode switch 43; he had previously set the values, $R=6$ on the upper sector limit switch, and $R=3$ on the lower sector limit switch. The upper and lower sector limit switches are merely two sets of manual switches whose settings correspond to some binary numbers. Between $t2$ and $t3$, R is approaching its first encounter with the lower section limit; at $t=t3$, R has reached the lower sector limit, which fact is detected by comparing the R register with the lower sector limit switch. Normal precission (where precessing is defined as the monotonic decrease in R through its successive values) is interrupted, and on the next memory cycle, with the indicator bit held in Channel B, the A channel address counter is set back to the upper sector limit ($R=6$) by setting the states of the counter flip-flops to the states prescribed by the upper sector limit switches. This occurs at $t_4$ and causes the R register to immediately thereafter go to the upper sector limit. Normal procession is then restored until $t_5$, when the process repeats.

Sectoring has no effect on the size of the memories or on the normal loading procedure. Sectoring is a special case of what happens during a normal sweep, except that in a normal sweep, the "upper limit" does not have to be "set" into the Channel A address counter because that number is the next one to occur at that time anyhow.

Flyback Delay

If the T-axis element of the output display requires a finite flyback time, this can be accounted for by halting precession for the required interval when the greatest value of R is achieved for each sweep. This can be done by halting the omission of one master clock pulse to the Channel A commutator for each Channel B memory scan, and results in R holding its highest value for several scans until the recording element has returned to its initial position. Since the R register is driving the recording element through a $D/A$ ladder 44, the element is forced to fly back and the maximum value of R is held long enough to overcome the inertia of the element. This is shown in FIG. 17, which is a modified version of FIG. 4. The flyback delay is used once each sweep, whether sectoring is used or not.

The Non-Simplified Features of Delay Correlator

The essential features and operation of the correlator device have been described above using a simplified 8-bit memory as an example. In presenting the actual delay correlator, the implications of a many-bit word must be considered, and the picture presented by the simplified version must be modified. These implications will now be considered one at a time and an attempt will be made to present a development which parallels that given for the 8-bit memory example.

Memory Format

With few exceptions, the Channel A and B memories 14 and 16, respectively, are identical. Each has 608 words of 32 bits each. Each is a magnetic core memory composed of 19 linear-select planes in a $32 \times 32$ array, and the memory is sequentially addressed. The register which addresses each memory is simply a binary counter because, with a single exception, the memory words are always examined in the same sequence. The exception occurs during sectoring, when the upper limit of R is SET into the Channel A address counter 46. Since the addressing register is a counter, selection of a new memory word is accomplished merely by advancing the counter.

Memory Cycle

In a typical memory word cycle, a memory timing block (48 for channel A for example) issues a series of signals. The first signal causes the address counter 46 to be advanced. The number contained in the address counter is decoded so as to activate a combination of line drivers and current routing switches which will allow only that address (or word) represented by the number in the address counter to be read or written into. A READ signal from the memory timing block 48 causes a read current to pass through the cores pertaining to the word in question. If any of these cores are caused to have their direction of magnetization changed, a voltage is induced in a line driving a SENSE AMPLIFIER 51, whose output sets a stage of the SENSE REGISTER 52. The selected memory word is thus placed into the sense register. The stages of the sense register are commutated by a commutator 53 whose output is an NRZ serial representation of the bits of the word. The word in the sense register is written back into the memory in the same address from which it came. A WRITE signal from the memory timing causes a write current to pass through the cores just read. At the same time, sense register stages which contain a logical "0" drive inhibit drivers which diminish the effect of the write current in the corresponding cores. This completes a memory word cycle; the address counter is again advanced at the start of a new cycle and the process is repeated. The only operation performed on a memory word while it is in the sense register is to commutate it. Inasmuch as the memory words are examined in sequence, the effect at the commutator output at 54 is that of a serial uninterrupted stream which contains the entire 19,456 bits of the memory.

The contents of the last several stages of the sense register are duplicated in a BUFFER REGISTER 56. The commutator first examines the first (unduplicated) part of the sense register. It then examines the buffer register. While the buffer register is being examined, the sense register is free to change its contents so that the commutator output remains uninterrupted.

Occasionally, when new information is to be written into the memory, the stages of the sense register are caused to be set not by the sense amplifiers, but rather by the stages of a LOADING REGISTER 57.

It is desirable to change the memory size to accommodate different signal bandwidths and to change the limits of integration applicable to the correlation accumulators. A MAXIMUM ADDRESS SWITCH 58 is provided to change the address counter moduli. The address counters for both channels and the C counter 39 all have the SAME modulus as determined by this switch. The maximum address so selected is a variable known as N.

Meaning of N

In the 8-bit memory example, N was equal to the number of bits in the memory and to the number of possible R values (or T values). However in the many bit and many word memory examples now being described, N is equal to the number of words in the memory; the number of R values and the number of bits in the memory is therefore 32N.

Timing Reference

That clock which drives the commutator and determines the system bit rate is the master clock 59. Thirty-two master clock cycles is one commuator cycle. Each commutator cycle causes a pulse at 61 to be sent to the memory timing block and brings a new word into the sense register. Since it is the outputs of the commutators which are used for the correlation comparison at 17, it is the appearance of a particular bit at the commutator output which is considered a primary timing event, rather than any other event, such as the transfer of the word containing that bit to or from the memory, or the advance of the address counter to the word containing that bit.

"Long Counter"

Since the master clock drives the commutator, and the commutator, through the memory timing, advances the address counter, the combination formed by the commutator and the address counter can be considered as one "long-counter" having a modulus of 32N. Therefore, when one varies the MAXIMUM ADDRESS SWITCH, it is only possible to change the memory size in multiples of 32 bits.

Precession

It was at the bit level (i.e., one bit per one master clock pulse) that the analysis of the 8-bit memory example was carried out. Recall, that in that analysis, precession (changing of R value) was carried out by not advancing Channel A at the beginning of each scan, so that the first bit of a scan was the same as the last bit of the previous scan. Since this process occurred at the bit level, in the delay correlator device, this effect is achieved by omitting one master clock pulse to the Channel A commutator 53 at the beginning of each scan. Thus, if both channels start a scan at word one, bit one, the beginning of the next scan will be marked by word one, bit one in Channel B (since it is the fixed channel) but by word N, bit 32 in Channel A. Channel A will continue to lose a bit each scan until, after 32 scans, the beginning bits will be: word one, bit one in B; word (N), bit one in A. Only every 32 scans will the commutators and the address counters be "in-phase." Only every 32N scans will the "long counters" be "in-phase."

A scan, of course, is now composed of N words, or 32N bits, and the bit which begins a scan (in Channel A) may be any of the possible 32N bits available; it is, of course, not restricted to values which are multiples of 32, as is the memory size (if measured in bits).

Loading

Loading is accomplished in a manner analogous to that shown in Table 5 wherein, more than one bit is loaded at a time and more than one scan may elapse between loadings. In the actual correlator device, loading is most easily accomplished one word at a time; therefore, 32 bits at a time are loaded. When the loading occurs, the stages of the sense register are set by sampling the stages of a load register 57 rather than by the sense amplifier output pulses.

Input Register

The bits contained in the successive stages of the load register represent successive samples taken at periodic intervals at the channel input. The load register is operated as a shift register, its first stage acting as the input; after 32 shift pulses the load register is full and is ready to transfer its contents, in parallel, to the sense register. At this time the sense register may contain a word which is nowhere near the one which should be loaded; but shifting in the load register must continue uninterrupted, otherwise the sampling will be non-uniform. Therefore, at this time, the contents of the load register are transferred, in parallel, to an input Buffer Register 62 (not the commutator buffer) so that shifting may continue in the load register; they are retained in the buffer register until the address at which they should be loaded comes up in the memory; not until then are they transferred to the sense register. Thus, part of the loading circuitry consists of a 32 bit load register (or Input Register) for each channel and a 32 bit buffer register for each channel.

Input Register as Ring Counter

The Input Register 57 for Channel A actually has 33 stages; the 33rd stage allows the register to be used as a ring counter: When the "A" register is cleared a "1" is inserted in the first stage; as the register shifts, the "1" propagates down the register; the arrival of the "1" in the 33rd stage is a signal that the register is full; at this time its contents are transferred to the buffer register and the Input Register is cleared. Bits are loaded simultaneously in both A and B channels, and therefore the 33rd stage is only needed on the Input Registerer of one of the channels—it is arbitrarily assigned to the Channel A Input Register.

The 32-stage buffer registers 62 and 63 fed by the Input Registers are, of course, not the same units as the buffer registers 56 and 64 located between the sense registers and the commutators. To distinguish between them, the former is designated as the Input Buffer; the latter is the Commutator Buffer.

Load Address Counter

In order to keep track of the memory word which is next to be loaded from the Input Buffer, a LOAD ADDRESS COUNTER 66 is used. The number contained in the Load Address Counter determines the address of the next memory word to be loaded. The Load Address Counter and the Address Counter (of each channel) are constantly compared at 67. When a positive comparison results, the memory word whose address is in the Load Address Counter is about to be transferred from the memory to the Sense Register; at this time, the word in the Input Buffer is put into the Sense Register instead, if there is a new word in the Input Buffer.

Since the memory words are loaded in sequence, the Load Address Counter is advanced by one for every load. Since a load can occur no more often than once a scan and no more often than the rate at which the Input Register fills, the shift pulses to the Input Register must have a period such that no more than 32 of them occur each scan; except for this restriction, the Input Register shift pulse rate may be asynchronously related to the master clock and may be driven by an external generator. To approximate the situation in the 8-bit memory example, loading should occur at the rate of one bit per scan; this means that it will take 32 scans to fill the Input Register and that a new word will be loaded into the memory every 32 scans.

The Load Address counters must have an upper limit equal to N, the same as the address counters—otherwise they may try (unsuccessfully) to load into the memory words which never occur. Therefore, the MAXIMUM ADDRESS SWITCH also controls the modulus of the Load Address Counter.

Recall that new information is always loaded into the same address in both channels. For this reason, the two Load Address Counters will always contain (approximately) the same number. Therefore, the Channel B Load Address Counter 68 is not actually a counter—it is merely a register which contains a number copied into it from the Channel A Load Address Counter (which actually IS a counter).

Even though sampling occurs at the same rate in each channel, and even though the contents of the Input Registers are transferred to the Input Buffers at the same time, it is not possible, in general, to transfer the contents of the Input Buffers to the Sense Registers at the same time. This is because the memory word into which the new information will be loaded does not come up at the same time in both channels because the memories are constantly precessing with respect to each other. In fact, the only scans in which the "long-counters" are "in-phase" (one scan out of every 32N scans) may be scans in which loading is not called for. In view of this, the following procedure is used.

Loading Procedure

When the A channel Input Register 57 is filled, a signal from its 33rd stage causes the contents of the Input Registers to be copied into the Input Buffers. This same signal is ANDed at 69 with a signal from the A channel memory timing block to advance the A Channel Load Address Counter. The ANDing is necessary to cause the Load Address Counter 66 and the Address Counter 46 to advance together so that a memory timing signal can be used to sample the comparator output when both counters are static. After sufficient time has elapsed to insure that the "A" Channel Load Address Counter has reached a static state, a signal is generated which, when ANDed at 71 with a signal from the B channel memory timing block 49, causes the contents of the A Channel Load Address Counter 66 to be transferred to the B Channel Load Address Register 68. The A Channel Load Address Counter is now compared with the A Channel Address Counter at 67 and when a positive comparison occurs, the word in the A Channel Input Buffer is loaded into the A Channel Sense Register.

Address Comparator

The ADDRESS COMPARATOR 67 of conventional construction puts out a signal which says the new-old border of Channel A ($N/O_A$) is occuring. Exactly the same thing happens in Channel B. New/Old borders are manifested in the machine of the agreement of memory and load addresses and the corresponding output from the address comparator. The comparator may be simply a network of gates with a signal output which indicates whether or not the two sets of inputs are in agreement. An agreement of a memory address with the load address means that the memory address is to be loaded with a new memory word or has, on a previous scan, been loaded with the newest memory word. Since the address comparators operate every scan, they put out the new-old border signals every scan, which are necessary to gate the accumulators properly. Only the first ADDRESS COMPARATOR signal after a change of load address, results in the transfer of bits from the INPUT BUFFER REGISTER to the SENSE REGISTER. For this purpose a flip flop is placed in a transfer state each time the load address is advanced. When bits are transferred from the input buffer register to the sense register, the flip flop is placed in a "don't transfer" state. The output of this flip flop is used to determine whether an agreement of load and memory addresses should generate a transfer of bits between registers. If the transfer of bits took place every comparison, bits could possibly be transferred while the contents of the buffer register was in the process of being changed. This would result in the loading of an ambiguous word into the memory.

Border Interchange

The result of this type of loading is that it is possible that in some scans the two new-old borders will not be at the same address in both channels, and therefore that the information in two normally corresponding addresses of the two channels will not be of the same age. However, the new-old borders will never be mislocated by more than one word (32 bits) from where they *should* be. A detailed study of this situation shows that the mislocation of the new-old borders has no effect on the procedure previously given for gating the accumulators unless, within a particular scan, the order of occurrence of the two new-old borders becomes interchanged. Since the borders can never be mislocated by more than one word, interchange cannot occur unless the proper border positions are within one word of each other. Under these circumstances, T is within one word (32 values) of $T=0$, and in this area the accumulator gating procedure is modified to include the entire scan. In a worse case condition in the Doppler mode, the range of T values under which border interchange may occur is increased from one word to over thirteen words. To be on the safe side, the accumulator gating procedure includes the entire scan whenever T is within 16 words of $T=0$. This covers the range $|T|\leq512$.

Accumulator Gating

In comparing the operation of the actual delay correlator to that of the 8-bit-memory example, the procedure for determining accumulator gating, and the accumulators themselves, are unchanged and remain essentially as shown in FIG. 9. The COMPARATOR 17 which feeds this circuit is, as it was before, an EXCLUSIVE NOR which is driven by the outputs of the two commutators 53 and 72.

R Register

The insertion of the proper value into the R register 27 is essentially as described, with a few minor modifications. Recall that R is determined by examining the address of Channel A when Channel B is reading a particular indicator bit. The indicator bit must be near the middle of a scan so that the least value of R will correspond to the least value of T. The two bits nearest to the middle of the scan are the last bit of the $N/2$th word and the first bit of the $(N/2+1)$st word. The latter is chosen for the following reason: It is not convenient to examine the bit address of Channel A when the indicator bit occurs in B. This is because the least significant digits of the "long-counter" are determined by the commutator, which is operating at high speed and which is not a binary counter, as is the address counter, which comprises the more significant digits of the "longcounter." Therefore, only the more significant digits (the address counter) are used to determine R. This restricts the resolution of the DETERMINED values of R to one out of every 32 values. The intermediate values are inferred by interpolation, but are nevertheless accurate.

The R register 27 is divided into two parts. One part pertains to the more significant digits and its contents are obtained by examining the address counter of Channel A. The other part is a five-stage binary counter which pertains to the least significant digits; this part counts down by one for every scan.

Determining R

Once every 32 scans, when the commutators are in phase, they send a signal to the R register control block 73. During this scan, the address counters advance together. When the Channel B address counter 47 arrives at word $(N/2+1)$, it is equivalent to the system being at the indicator bit (bit one of word $N/2+1$). At this time the contents of the A address counter are placed in the more significant portion of the R register at 27C. At the same time, the least significant portion of the R register (the counter) is set to its highest value (11111). During the next 32 scans, the commutators are NOT in phase; therefore the A Channel address counter 46 is not examined to determine R. Instead, the counter portion of the R register is counted down by one each scan. When this portion of the R register reaches its lowest value (00000) the commutators come into phase again, and the more significant portion of the R register is ready to be updated once more.

Sectoring

Sectoring occurs exactly as described for the 8-bit example, i.e., the R register contents are compared with the setting on the lower sector limit switches; when a comparison exists, the flyback delay is initiated, which stops precession and at the same time causes the number determined by the upper sector limit switches to be set into the A channel address counter on the next memory cycle, while word $(N/2+1)$ is held in Channel B. The R register-lower sector limit comparison is only made for the more significant bits of the R register. This is because only the more significant bits of the A channel longcounter (the address counter) can be set. Therefore, both the recognition of the lower sector limit, and the setting of the upper sector limit must be done when the commutators are in phase, which restricts the R values available as sector limits to multiples of 32. The phase relationship is recognized by the phase detector of FIG. 1B.

C Counter

In the delay correlator, the C counter 39, which is a conventional counter like the address counters, has the same capacity as the "long-counter" of either channel. Since its only purpose is to provide one output every time it counts to its modulus, it is unnecessary to divide it into two parts as is done with the A and B channels (where the commutator is the least significant part and the address counter the most significant). Nevertheless, it is divided into two parts with its least significant part being a modified commutator, half the length of the channel commutators. It counts to 16 (rather than 32) and has no input gates. The more significant portion is a binary counter (like the address counters) which makes up for the shortness of the commutator by having one more stage than the address counters. This arrangement is used because the commutators count at a rate too fast for the binary portion and this rate must be decreased by a count-down in the commutator portion before going into the slower binary circuitry.

As stated before, the C counter runs synchronously with the A channel in the Doppler mode, although it starts to count together with the B channel. This means that when advance pulses are inhibited from the A channel "long-counter" by the Doppler oscillator, they are also inhibited from the C-counter. When the fast channel gets to its end-of-scan, this fact is marked by an output from the "B" address counter's maximum count detector if the "B" channel is the faster, or by an output from the "C" counter's maximum count detector if the "A" channel is the faster. When such an output occurs, the faster channel is stopped. When the slow channel gets to its end of scan, whichever of the two maximum count detectors which has not previously been activated is activated at this time. The fact that both maximum count detectors have been activated cause a signal to release the fast channel from its stopped condition and at the same time inhibits a single pulse from the A channel to effect a T-change. This event marks the beginning of a new scan.

The C-counter 39 (FIG. 1D) has the same capacity as the address counters of both channels. The C-counter, being coupled to the master clock through the same start-stop gate and Doppler correction control block as the "A" channel commutator, is caused to run in synchronism with the "A" channel, but it starts its count together with the "B" channel such that a maximum count in the C-Counter occurs when the "A" channel reaches its end-of-scan; at this time, application of outputs from both maximum count detectors to the AND gate causes the two channels to be restarted together if the "A" channel is the slower channel. If the "B" channel is the slower channel, the "C" counter maximum count detector output will interrupt clock pulses to the C-counter and "A" channel commutator 53, so the "A" channel is stopped.

Even when the Doppler mode is not used, the C-Counter runs in synchronism with the A channel counter. It still requires a conjunction of the B channel counter and the C counter being at the ends of their respective scans to inhibit the single pulse from the A channel. This is because, in going from the Doppler to the non-Doppler mode, no changes are made in concept or circuitry; instead, the frequency of the Doppler oscillator becomes zero. The C counter still runs in synchronism with the A channel and starts its count together with the B channel.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:
1. A correlating system comprising:
first and second receptors spaced apart and spaced from a signal source and responsive to signals produced by said source;
first and second signal processing channels, said first channel having a signal input for signals derived from said first receptor, and said second channel having a signal input for signals derived from said second receptor;
a memory in each channel, the memory in said first channel storing data derived from said signal input thereof and the memory in said second channel storing data derived from said signal input thereof;
updating means for regularly replacing old data in each of said memories with new data;
memory reading means in said channels for producing at the channel outputs simultaneously, data stored in the memories of the channels;
delay means coupled to said channels and operable to take certain data units derived from signals received simultaneously at said receptors and cause said reading means to remove said certain data units from the memories of both channels at a plurality of different times, and to remove one of said certain data units from one channel memory at increasingly different times from the times of removal of a corresponding one of said certain data units from the other channel memory;
comparator means coupled to the said channel outputs of both channels and producing an output varying in accordance with the degree of correlation between data units removed simultaneously from both channel memories; wherein:
said memories are magnetic core arrays;
said reading means include first and second memory address counters scanning through memory addresses in sequence;
and said delay means includes means causing precession in the addressing of the memory of one channel with respect to the addressing of the memory of the other channel by a predetermined number of bits for each scan through all addresses of the memory,
said system further comprising clipping and sampling means between said receptors and said signal inputs for converting to binary form the signals produced in said receptors by said source.
2. The system of claim 1 wherein said channels are arranged to store said data in binary form, said system further comprising:
Doppler correcting means coupled to said channels and including means coupled to the memory of one of said channels to cause repetition of a bit therein at regular intervals, said correcting means being adjustable to establish said intervals as required by the difference in radial components of velocity between said signal source and said receptors to eliminate the Doppler effect from data produced at said channel outputs.
3. A correlating system as set forth in claim 1 and further comprising:
visual recording means including a chart driven in a predetermined manner with the passage of time, and including a marking member having drive means coupled to said reading means and coordinated thereby to move across said chart increasingly greater distances from a starting point, in synchronism with the said removal of one of said certain data units at increasingly different times, and said visual recording means including marking member intensity control means coupled to said comparator to increase intensity of marks produced by said member on said chart as the said degree of correlation increases.
4. A delay correlator comprising:
first and second signal processing channels, said first channel having a signal input for signals derived from a first receptor responsive to signals produced by a source, and said second channel having a signal input for signals derived from a second receptor responsive to said signals produced by said source;
first and second time compressors in said first and second channels respectively, each compressor having an input coupled to the signal input for its respective one of said channels, phasing means coupled to said time compressors and establishing a set of different phase relationships between data recalled from said first time compressor and data recalled from said second time compressor, comparator means coupled to said first and second time compressors and comparing the output data therefrom at each one of the different phase relationships of the set to produce an output indicative of the degree of correlation between compressor outputs at each different phase relationship, Doppler correcting means coupled to said channels and adjustable according to differences in radial components of velocity between said signal source and said receptors to eliminate the Doppler effect from data produced at said channel outputs;

wherein said time compressors store data in binary digital form, said Doppler correcting means being coupled to said time compressors and effecting repetition of bits in the output of one of said time compressors at intervals determined by the difference between the radial components of velocity of said source with respect to said receptors.

5. A delay correlator comprising:

a first input for a binary signal representing the output of a first receptor responsive to the signal of a source;

a second input for a binary signal representing the output of a second receptor responsive to the signal of said source;

first loading means entering binary signals from said first input into a first group of memory addresses;

second loading means entering binary signals from said second input into a second group of of memory addresses;

the said loading means taking signals simultaneously obtained from both receptors and entering the simultaneously obtained signals into corresponding memory addresses of both groups, means simultaneously scanning the said addresses and producing in series at first output means the signals from addresses of said first group and producing in series at second output means the signals from addresses of said second group, said scanning means being arranged to make repetitive scans and change by a predetermined amount for each different scan the actual time of production of signals from corresponding addresses of said first and second groups at said first and second output means respectively, and comparator means coupled to said first and second output means to produce an output representing the degree of correlation between signals stored in said groups for each amount of difference between actual times of reading, said first loading means including a first shift register having a storage capacity at least as large as that of one of said memory addresses and serially receiving and storing said binary signals from said first input as a series of samples taken successively at periodic intervals at said first input, and said first loading means including a first input buffer register having a capacity adequate to store all the signals stored at any time in said shift register, said shift register being coupled to said input buffer register and transferring its contents in parallel to said buffer register whenever said shift register becomes full, to store said contents for loading at a proper address at a proper time and yet enable continuous uninterrupted loading of said shift register with samples from said input.

6. The delay correlator of claim 5 wherein:

said scanning means includes memory addressing means processing in sequence each address of said first group beginning at a selected address therein and simultaneously processing in sequence each address of said second group beginning at a selected address therein to complete one scan, and then beginning a second scan starting with the last processed address in said first group and with said selected address of said second group and processing addresses in the same sequence in said second scan as in said first scan, and beginning each subsequent scan with the address of the first group last processed in the next preceding scan and with said selected address of said second group.

7. The delay correlator of claim 5 wherein said first loading means further includes:

a first sense register coupled to said first input buffer register and to said first group of memory addresses whereby a set of binary signals from said buffer register is entered in a proper address of said first group to update the information in said first group;

a first load address counter advancing one step for each time a set of binary signals is entered from said input buffer register into an address of said first group;

a first memory address counter advancing one step for each time the signals from an address are produced at said first output means;

a first count comparator coupled to said counters and producing an output upon detection of identical counts in said load address counter and in said memory address counter to enter said set of binary signals into the said proper address as designated by said first memory address counter when the count therein and in said first load address counter are identical, said first input buffer register receiving binary signals in parallel sets from said first shift register and storing a set therein while said first shift register continues to receive binary signals serially.

8. The delay correlator of claim 7 wherein:

first commutator means are coupled to said first sense register for producing the serial output of the binary signals at said first output means.

9. The delay correlator of claim 8 wherein:

said first commutator means is coupled to a memory timing means coupled to said address counters and, upon reaching a predetermined bit position supplies a pulse to said timing means to advance said first memory address counter and thereby initiate a new memory word cycle.

10. The correlator of claim 5 and further comprising:

control means coupled to said scanning means and limiting the attainable difference in actual times of the said production of signals from corresponding addresses, thus establishing a sweep with a predetermined number of scans therein, said control means effecting repetitive sweeps with said repetitive scans therein.

11. The correlator of claim 10 and further comprising:

memory updating means coupled to said input to put new information derived from said input into said addresses during each sweep, the timing of said updating means and said control means being arranged to complete a plurality of sweeps before each complete updating of the information content of all of said addresses.

12. Correlator apparatus comprising:

a first input for a binary signal representing the output of a first receptor responsive to the signal of a source;

a second input for a binary signal representing the output of a second receptor responsive to the signal of said source;

first loading means entering binary signals from said first input into a first group of memory addresses;

second loading means entering binary signals from said second input into a second group of memory addresses, the said loading means taking signals simultaneously obtained from both receptors and entering the simultaneously obtained signals into corresponding memory addresses of both groups;

first memory addressing means processing in sequence each address of said first group beginning at a selected address therein;

second memory addressing means processing in sequence each address of said second group beginning at a selected address therein, the processing of all desired addresses in the first group constituting a scan of the first group, and the processing of all desired addresses of said second group constituting a scan of said second group, said first and second addressing means being controlled to simultaneously process in sequence each address of said first and second group beginning at the said selected addresses therein, to complete one scan of both groups, and said addressing means being controlled to then begin a second scan in each group starting with a certain bit of said first group and with said selected address of said second group and processing addresses in the same sequence in said second scan as in said first scan, and said addressing means being further controlled to begin each subsequent scan with a different bit of the first group and with said selected address of said second group, whereby the addressing in said first group precesses by a certain amount with respect to the addressing in said second group for each subsequent scan thereby simulating various differences between time of arrival at said first and second receptors of a signal produced by said source, the signals stored in said groups being produced at output means for the respective groups in serial form during said scans.

13. The correlator apparatus of claim 12 and further comprising:

a register coupled to said first addressing means;

a register control coupled to said second addressing means; and means coupling said register control to said register and effecting the storage in said register of a number R representing an address being processed in said first group when the $$\frac{N}{2}+1$$

address is being processed in said second group, whereby the number in said register is equal to $$\frac{N}{2}+T$$

where N is the number of addresses designated to be processed in said second group during each scan and T is a number representing the simulated difference for the scan then taking place.

14. The correlator apparatus of claim 13 wherein: said register includes a portion deriving the more significant digits of the number R from said first addressing means at selected scans, and said register includes a counter portion progressing through a series of values for each selected scan to provide the least significant digits of the number R.

15. The correlator apparatus of claim 13 and further comprising:

sectoring means including lower limit switch means and comparing means, said comparing means being coupled to said register and to said switch means and said switch means being manually operable to represent a number desired for the lower limit of the range of differences to be simulated, said comparing means producing an output upon attainment of a duplication of the lower limit number by the number in said register to thereupon initiate a sequence of events such that the next following simulated difference corresponds to the upper limit of the range of differences to be simulated, said sectoring means including upper sector limit switch means coupled to said first addressing means, said upper sector limit switch means being manually operable to represent a number desired for the upper limit of the range of differences to be simulated, the coupling to said first addressing means enabling the setting of said upper limit number into said first addressing means in the course of said sequence of events.

16. The correlator apparatus of claim 13 wherein:

said first addressing means includes a first address counter and said second addressing means includes a second address counter;

a first commutator is coupled to said first group and is operable upon the information in each processed address of said first group to produce the serial output for each address of said first group; and a second commutator is coupled to said second group and is operable upon the information in each processed address of said second group to produce the serial output for each address of said second group;

said commutators being arranged for the shifting of one by a predetermined amount with respect to the other for each different scan;

a phase detector is coupled to said commutators to determine the phase relationship therebetween, said detector being responsive to an "in phase" relationship of said commutators to send a signal to said register control to enable said register control to cause storage of the number R in said register in response to attainment of the $$\frac{N}{2}+1$$

count in said second address counter.

17. The correlator apparatus of claim 12 wherein:

said first addressing means includes a first address counter and said second addressing means includes a second address counter;

a first commutator has an input coupled to said first group and has output means and is operable upon the information in each processed address of said first group to produce the serial output for each address of said first group at said output means;

a second commutator is coupled to said second group and has output means and is operable upon the information in each processed address of said second group to produce the serial output for each address of said second group;

the addressing means being arranged to stop the address processing in their respective channels when the address counter therefor has attained a designated maximum count;

comparator means having input means coupled to the output means of said commutators and comparing the serial output of said first commutator with the serial output of said second commutator, said comparator means having output means and producing at said output means an output representing the similarity between bits from said commutators as produced;

accumulator means having input means coupled to said comparator output means and generating an output representing the degree of correlation between the serial outputs as scanning progresses; and gating means coupled to said accumulator means, said gating means including a first input for a signal generated upon processing the first bit in said first group, and said gating means including a second input for an indicator bit signal derived from said second group, said gating means including a third input for a signal indicating passage of a new-information/old-information border in said first group during a scan, and said gating means including a fourth input for a signal indicating passage of a new-information/old-information border in said second group during the scan, said gating means being operable in response to signals at said inputs thereof to enable said accumulator means to respond to comparator output signals derived only from comparison of those bits whose age difference corresponds to the said time difference intended to be simulated during a scan.

18. The correlator of claim 17 wherein said accumulator means include two correlation accumulators, said gating means including means switching the comparator output signals to one of the accumulators for one scan and switching the comparator output signals to the other accumulator for the next scan and thus alternating the accumulator receiving comparator signals for each different scan in succession, to enable one accumulator to be read-out and reset while the other is integrating a scan in progress.

19. The correlator of claim 18 wherein said accumulator means include two time accumulators coupled to said gating means and integrating the time of activation of said correlation accumulators, said correlator further comprising divider means coupled to the output of each correlation accumulator and to the output of the time accumulator therefor to take the ratio of the outputs of said correlation accumulators to the output of the time accumulators therefor to produce a normalized output for each correlation accumulator.

20. The correlator of claim 17 wherein said gating means further includes first, second, and third bistable circuit devices, each having setting and resetting inputs and set and reset outputs of different potential levels when the device is set, said levels being reversible when the device is reset,
said first circuit device having its setting input receiving an end of scan signal and the resetting input thereof being said first input of said gating means,
said second circuit device having its setting input coupled through a first AND circuit to the set output of said first device and to said second input of said gating means, and said second device having its resetting input coupled through a second AND circuit to the reset output of said first device and to said second input means whereby the reset output of said second device has a signal thereon indicating the sign of the difference in age between the bits being compared for a scan,
the setting input of said third device being said third input of said gating means and the resetting input of said third device being said fourth input of said gating means,
said gating means including exclusive-OR circuit means having inputs coupled to the outputs of said second and third circuit devices, said exclusive-OR circuit means and said comparator means having the output means thereof coupled to inputs of a third AND circuit, the output of said third AND circuit being coupled to the input of said accumulator means whereby said third AND circuit gates the appropriate comparator output signals to said accumulator means and inhibits passage to said accumulator means of other comparator output signals.

21. The correlator of claim 20 and further comprising:
comparing means having inputs coupled to said first and second address counters and an output coupled to said exclusive-OR circuit means and operable, in response to the attainment by said counters of counts indicating a simulated time difference less than a predetermined amount, to produce an output to said exclusive-OR circuit means causing activation of said third AND circuit and thereby passing all of said comparator output signals to said accumulator means when said simulated difference is less than said predetermined amount.

22. The correlator apparatus of claim 12 and further comprising:
first commutator means coupled to said first group and operable to produce a serial output of information in processed addresses of said first group;
second commutator means coupled to said second group and operable to produce a serial output of information in processed addresses of said second group;
a clock driving said commutator means;
first address counting means in said first memory addressing means;
second address counting means in said second memory addressing means, and commutator bit counting means in said second commutator means;
first control means coupled to said second address and commutator counting means and normally passing clock pulses to said commutator means, said control means responding to attainment of a predetermined maximum address and commutator count to omit a clock pulse from said first commutator means at the start of each scan while said second commutator means starts a new scan to effect the repetition of a bit at the output means of said first group by said first commutator means once for each scan and thereby achieve the address precession.

23. The apparatus of claim 22 and further comprising:
a frequency spectrum analyzer coupled to said first and second inputs to indicate frequency differences between the signals on said inputs;
a variable frequency oscillator adjustable according to frequency indications of said analyzer;
second control means coupled between said clock and said first commutator means; and third control means coupled between said clock and said second commutator means; and
a selector coupled to said second and third control means and to said oscillator and switchable between: one condition causing said oscillator to operate said second control means to omit clock pulses from said first commutator means at the oscillator frequency and; another condition causing said oscillator to operate said third control means to omit clock pulses from said second commutator means at the oscillator frequency,
whereby bits produced at the output means for said groups are repeatable for the appropriate group and at the appropriate rate to compensate for Doppler effects on signal frequency at said inputs.

24. The apparatus of claim 23 and further comprising:
additional counter means having a capacity corresponding to the capacity of said address counting means, said additional counter means being coupled through said second control means to said clock to run in synchronism with said first addressing means;
first maximum count detector means having an input coupled to said additional counter means;
second maximum count detector means having inputs coupled to said second address and commutator bit counting means;
a first gate coupled between said clock and said additional counter and said first commutator means to stop and start operation thereof, said first gate having a stop signal input coupled to said first maximum count detector means for stopping said first addressing means when a predetermined count is detected by said first detector means;

a second gate coupled between said clock and said second commutator means to stop and start operation thereof, said second gate having a stop signal input coupled to said second maximum count detector means for stopping said second addressing means when said predetermined count is detected by said second detector means;

a third gate having output means coupled to start signal input means of said first and second gates, said third gate having input means coupled to said first and second maximum count detector means, said third gate being operable in response to the simultaneous presence at its said input means of predetermined count indicating outputs of said detector means to cause said first and second gates to start said first and second addressing means together.

References Cited

UNITED STATES PATENTS

| | | | |
|---|---|---|---|
| 3,145,341 | 8/1964 | Andrew | 325—473 X |
| 3,157,874 | 11/1964 | Altar et al. | 325—473 X |
| 3,249,911 | 5/1966 | Gustafsson | 235—181 X |
| 3,355,579 | 11/1967 | Robertson | 235—181 |
| 3,351,943 | 11/1967 | Bush et al. | 343—112 |

EUGENE G. BOTZ, Primary Examiner

U.S. Cl. X.R.

235—152, 150.53; 343—5, 100; 325—473